(12) United States Patent
Purcell

(10) Patent No.: US 6,963,896 B2
(45) Date of Patent: Nov. 8, 2005

(54) METHOD AND SYSTEM TO IMPLEMENT AN IMPROVED FLOATING POINT ADDER WITH INTEGRATED ADDING AND ROUNDING

(75) Inventor: Stephen Clark Purcell, Mountain View, CA (US)

(73) Assignee: Pasternak Solutions LLC, Los Altos, CA (US)

( * ) Notice: Subject to any disclaimer, the term of this patent is extended or adjusted under 35 U.S.C. 154(b) by 716 days.

(21) Appl. No.: 09/919,713

(22) Filed: Jul. 31, 2001

(65) Prior Publication Data

US 2003/0131036 A1 Jul. 10, 2003

(51) Int. Cl.[7] .............................................. G06F 7/50
(52) U.S. Cl. ...................................... 708/505; 708/497
(58) Field of Search ................................ 708/505, 497

(56) References Cited

U.S. PATENT DOCUMENTS

| | | | | |
|---|---|---|---|---|
| 5,303,175 A | * | 4/1994 | Suzuki ........................ 708/497 |
| 5,373,461 A | * | 12/1994 | Bearden et al. .............. 708/505 |
| 5,390,134 A | * | 2/1995 | Heikes et al. ................ 708/497 |
| 5,408,426 A | * | 4/1995 | Takewa et al. .............. 708/497 |
| 5,790,445 A | * | 8/1998 | Eisen et al. .................. 708/505 |
| 6,148,314 A | * | 11/2000 | Matheny et al. ............. 708/497 |
| 6,148,316 A | * | 11/2000 | Herbert et al. ............... 708/505 |

* cited by examiner

*Primary Examiner*—D. H. Malzahn
(74) *Attorney, Agent, or Firm*—Townsend and Townsend and Crew LLP

(57) ABSTRACT

Systems and methods to implement an improved floating point adder are presented. The adder integrates adding and rounding. According to an exemplary method, of adding two floating point numbers together, a first mantissa, a second mantissa, and an input bit are added together to produce a third mantissa. The third mantissa is normalized to produce a final mantissa. The third mantissa and the final mantissa are correctly rounded as a result of the act of adding, so that the final mantissa does not require processing by a follow on rounding stage.

17 Claims, 4 Drawing Sheets

METHOD AND SYSTEM TO IMPLEMENT AN IMPROVED FLOATING POINT ADDER WITH INTEGRATED ADDING AND ROUNDING

TECHNICAL FIELD

The present invention relates to computing and floating point arithmetic, and, more particularly, to systems and methods to implement an improved floating point adder.

BACKGROUND

The Institute of Electrical and Electronics Engineers (IEEE) specifies a standard, IEEE Std 754, for representation and conversion of exponential or floating point numbers. For example, integer numbers can be converted to exponential numbers and binary numbers can be used to represent different parts of the exponential numbers. In particular, an exponential, or floating point, number includes a sign, a significant or mantissa, and an exponent. The precision of the floating point number indicates the number of bits available to represent the floating point number; that is, the higher the precision, the more bits available. A single precision floating point number is represented by 32 bits: one bit for the sign bit, eight bits for the exponent, and 23 bits for the mantissa. For norm numbers, a bit value of one is understood to precede the 23 bits of the mantissa, becoming in effect, an implicit one most significant bit.

Floating point arithmetic is used for high-powered computing operations that require millions or billions or more of floating point operations per second (FLOPS). Basic functional building blocks such as floating point adders, multipliers and dividers are used to perform the arithmetic operations on floating point numbers. Numerous methods and systems of implementing binary adders in compliance with the IEEE 754 standard are well known in the art. A common general technique for adding two floating point numbers includes aligning and then adding the mantissas of the floating point numbers to produce an arithmetic result for a mantissa. Arriving at the final result for the mantissa and for the calculation typically involves continued shifting and aligning, followed by a final rounding step, according to, for example, the round to nearest method of IEEE Std 754.

The design of floating point arithmetic functions to manage high amounts of data throughput at ever increasing speeds and in ever reducing chip area presents challenges for designers of circuit architecture to contend with. Implementations of floating point arithmetic functional blocks, such as binary floating point adder implementations, need to become faster, more efficient, and take up less space on-chip. Accordingly, it would be desirable to provide alternative implementations and schemes that do not suffer from the drawbacks and weaknesses of existing implementations but rather that are faster, more efficient, that consume incrementally less space on chip.

SUMMARY

The presently preferred embodiments described herein include systems and methods for implementing an improved floating point adder that integrates adding and rounding.

A method of adding a first floating point number to a second floating point number is provided according to one aspect of the invention. According to the method, a first mantissa, a second mantissa, and an input bit are added together to produce a third mantissa. The third mantissa is normalized to produce a final mantissa. The third mantissa and the final mantissa are correctly rounded as a result of the act of adding.

A method of adding a first floating point number to a second floating point number is provided according to a further aspect of the invention. According to the method, a first mantissa is added to a second mantissa. A fourth mantissa is added to an input bit to round the fourth mantissa. A third mantissa is normalized. The acts of adding are integrated together within a single adder to produce the third mantissa.

A method of adding a first floating point number to a second floating point number is provided according to another aspect of the invention. According to the method, a first mantissa, a second mantissa, and an input bit are added together to produce a third mantissa and an output bit. The third mantissa is rounded by updating the input bit based on the output bit to produce a ID fourth mantissa. The fourth mantissa is normalized. The acts of adding and rounding are integrated within a single adder so that a separate adder to produce a correctly rounded result is not needed and so that the acts of adding and rounding are performed prior to the act of normalizing.

A method of adding a first floating point number to a second floating point number is provided according to a further aspect of the invention. According to the method, a first floating point number having a first mantissa and a second floating point number having a second mantissa are received. The first floating point number, when added to the second floating point number, produces a third floating point number having a third mantissa. The first mantissa and the second mantissa are respectively left-shifted as appropriate to obtain a fourth mantissa and a fifth mantissa. A first carry bit is produced from a second carry bit and from round control variables derived from the first mantissa and the second mantissa. The fourth mantissa, the fifth mantissa and the first carry bit are added together to produce a sixth mantissa and the second carry bit. The sixth mantissa is correctly rounded. The sixth mantissa is right-shifted to produce the third mantissa.

A floating point adder system to add a first floating point number to a second floating point number is provided according to another aspect of the invention. The system includes an adder and a shifter coupled to the adder. The adder performs an add operation to add a first mantissa, a second mantissa, and an input bit together to produce a third mantissa. The shifter normalizes the third mantissa to produce a final mantissa, The third mantissa and the final mantissa are correctly rounded as a result of the add operation performed by the adder.

BRIEF DESCRIPTION OF THE DRAWINGS

The foregoing and other features, aspects, and advantages will become more apparent from the following detailed description when read in conjunction with the following drawings, wherein.

DETAILED DESCRIPTION OF THE PRESENTLY PREFERRED EMBODIMENTS

The present invention will now be described in detail with reference to the accompanying drawings, which are provided as illustrative examples of preferred embodiments of the present invention.

The presently preferred embodiments described herein include systems and methods for implementing an improved floating point adder that integrates adding and rounding. Two mantissas are added together to produce a correctly rounded mantissa prior to normalization of the mantissa, making a follow on rounding stage unnecessary and conserving more space on chip. With feedback of a carry output of the adder, a less significant bit of the correctly rounded mantissa is a function of a more significant bit of the mantissa.

Figure 1:
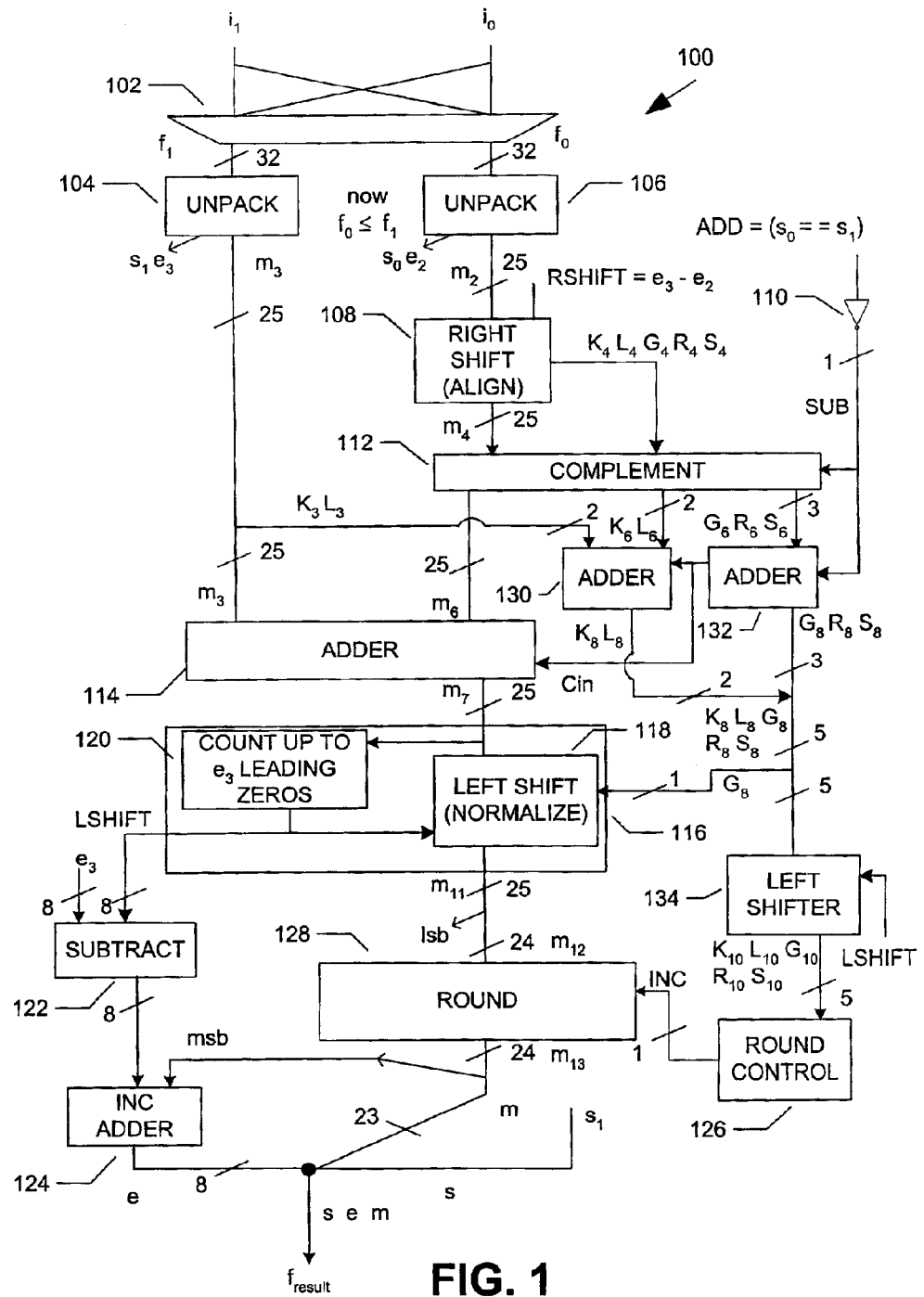
FIG. 1 is a diagram illustrating an exemplary floating point adder according to a first embodiment.

FIG. 1 is a diagram illustrating an exemplary floating point adder (FADD) 100 according to a first embodiment. The FADD 100 includes a swapper stage 102, a first unpack stage 104, a second unpack stage 106, a right shifter 108, a complement stage 112, an adder stage 114, a normalizer stage 116, a subtract stage 122, an increment adder stage 124, round control logic 126, a rounding stage 128, adders 130, 132, and a left shifter 134. The normalizer stage 116 includes a count up to $e_3$ leading zeros stage 120 and a left shifter 118.

Figure 2:
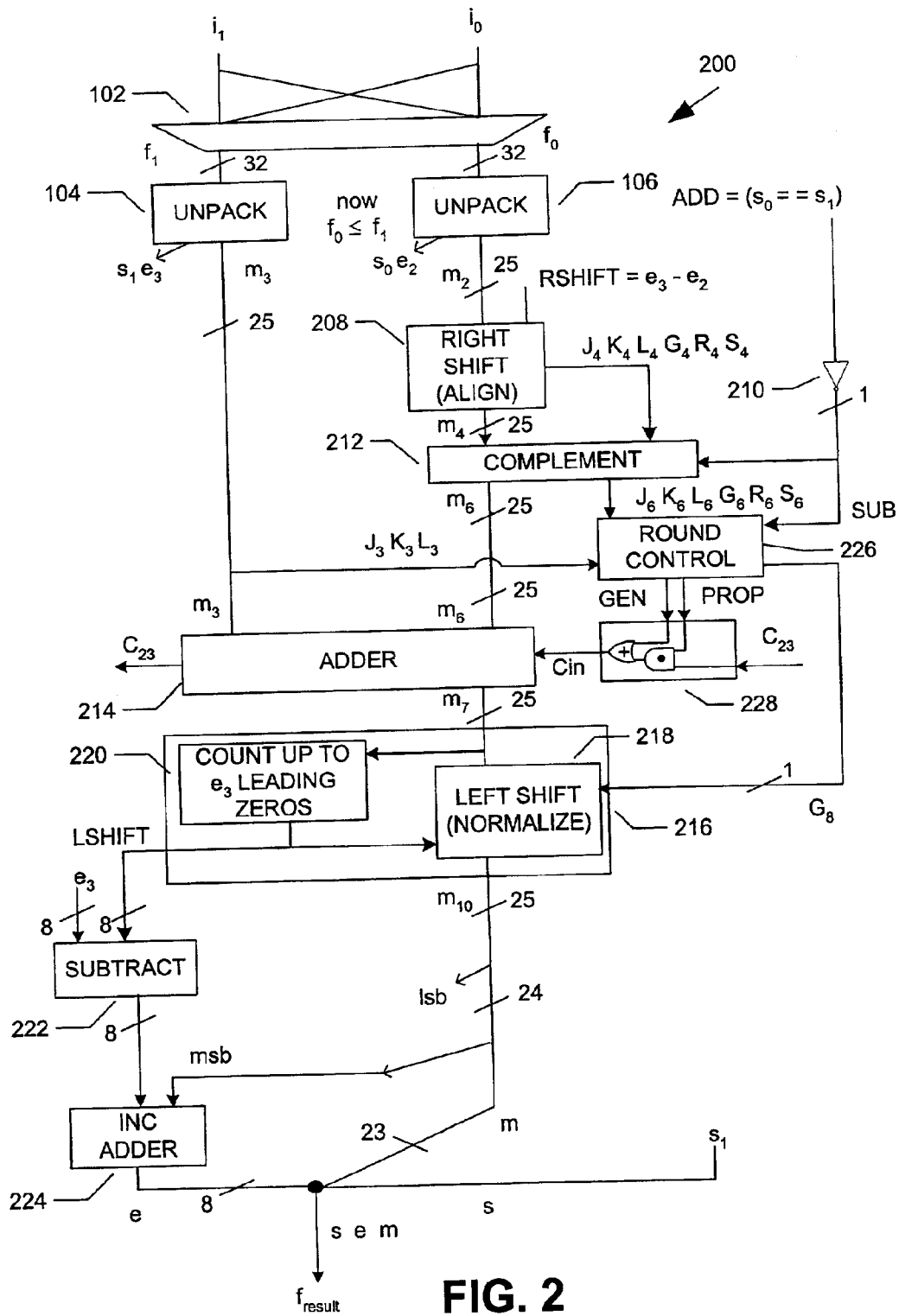
FIG. 2 is a diagram illustrating an exemplary floating point adder according to a second presently preferred embodiment.

FIG. 2 is a diagram illustrating an exemplary floating point adder (FADD) 100 according to a second presently preferred embodiment. The FADD 200 includes the swapper stage 102, the first unpack stage 104, the second unpack stage 106, a right shifter 208, a complement stage 212, an adder stage 214, a normalizer stage 216, a subtract stage 222, an increment adder stage 224, round control logic 226, and carry logic 228. The normalizer stage 216 includes a count up to $e_3$ leading zeros stage 220 and a left shifter 218.

Figure 3A:
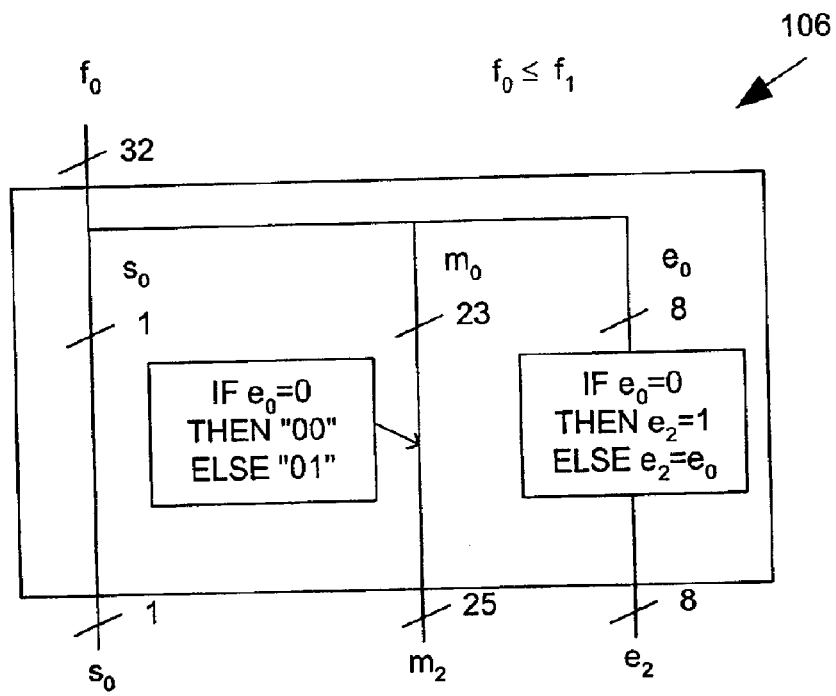
FIGS. 3A and 3B are diagrams illustrating the unpack stages according to FIGS. 1 and 2.
Figure 3B:
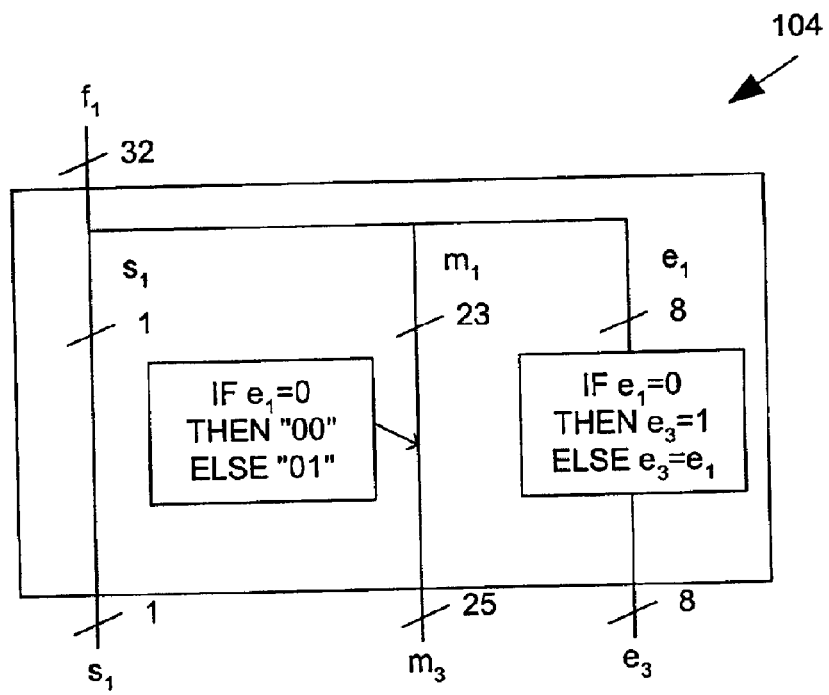

FIGS. 3A and 3B are diagrams illustrating the unpack stages 104, 106 according to FIGS. 1 and 2. The second unpack stage 106 of FIG. 3A unpacks a floating point number $f_0$ into a sign bit $s_0$, a 23 bit mantissa $m_0$, and an 8 bit exponent field $e_0$. If $e_0$ is equal to zero, the second unpack stage 106 supplements the mantissa $m_0$ with "00" to form a 25 bit mantissa $m_2$ and forms an 8 bit exponent field $e_2$ that is equal to one. If, as is far more commonly the case, $e_0$ is not equal to zero but is less than 255, the second unpack stage 106 supplements the mantissa $m_0$ with "01" to form a 25 bit mantissa $m_2$ and forms an 8 bit exponent field $e_2$ that is equal to $e_0$.

Similarly, the first unpack stage 104 of FIG. 3B unpacks a floating point number $f_1$ into a sign bit $s_1$, a 23 bit mantissa $m_1$, and an 8 bit exponent field $e_1$. If $e_1$ is equal to zero, the first unpack stage 104 supplements the mantissa $m_1$ with "00" to form a 25 bit mantissa $m_3$ and forms an 8 bit exponent field $e_3$ that is equal to one. If, as is far more commonly the case, $e_1$ is not equal to zero but is less than 255, the second unpack stage 104 supplements the mantissa $m_1$ with "01" to form a 25 bit mantissa $m_3$ and forms an 8 bit exponent field $e_3$ that is equal to $e_1$.

Figure 4:
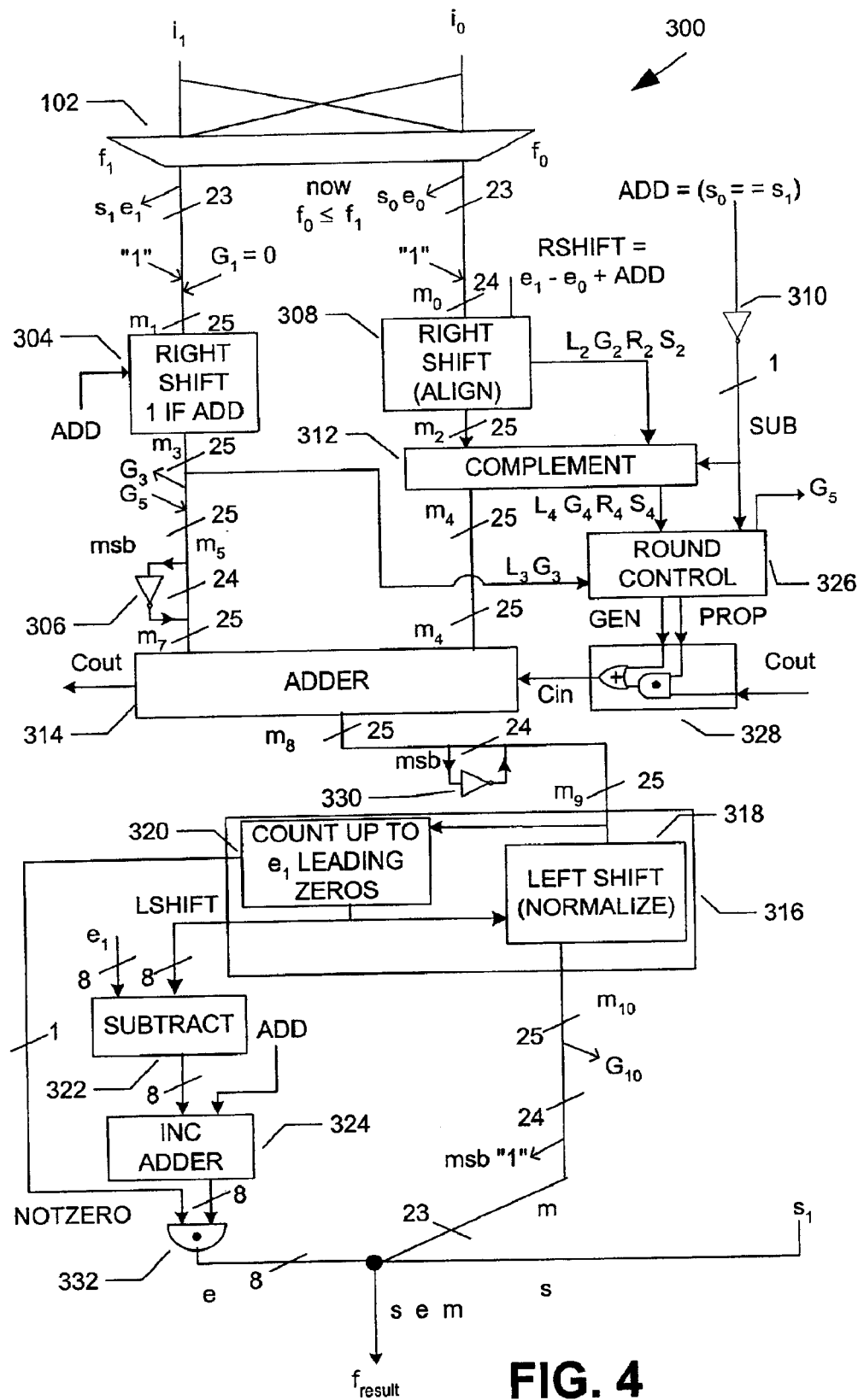
FIG. 4 is a diagram illustrating an exemplary floating point adder according to a third presently preferred embodiment.

FIG. 4 is a diagram illustrating an exemplary floating point adder (FADD) 300 according to a third presently preferred embodiment. The FADD 300 includes the swapper stage 102, a first right shifter 308, a second right shifter 304, inverters 306, 310, 330, a complement stage 312, an adder stage 314, a normalizer stage 316, a subtract stage 322, an increment adder stage 324, round control logic 326, carry logic 328, and eight two input AND gates 332. The normalizer stage 316 includes a count up to $e_1$ leading zeros stage 320 and a left shifter 318.

Operation of the First Embodiment

Processing of the exemplary FADD 100 shown in FIG. 1 according to the first embodiment is now described. The swapper stage 102 receives two floating point numbers, $i_1$ and $i_0$, and compares the unsigned magnitudes of the numbers to determine their relative size. The number whose magnitude is less than or equal to the unsigned magnitude of the other number is designated $f_0$ and is processed on the right-hand side of FIG. 1. The greater or equivalent other number is designated $f_1$ and is processed on the left-hand side of FIG. 1. The floating point number $f_0$ includes a sign bit $s_0$ (bit 31 of 32), an eight bit exponent field $e_0$ (bits 30–23 of 32), and a mantissa or significant field (bits 22–0 of 32). The floating point number $f_1$ includes a sign bit $s_1$ (bit 31 of 32), an eight bit exponent field $e_1$ (bits 30–23 of 32), and a mantissa or significant field (bits 22–0 of 32).

The floating point numbers $f_1$ and $f_0$ are processed by the unpack stages 104, 106, respectively, as described above, so that on the left-hand side of FIG. 1, the sign bit $s_1$ and the eight bit exponent field $e_3$ are removed from $f_1$, leaving a 25 bit adjusted mantissa $m_3$, and on the right-hand side of FIG. 1, the sign bit $s_0$ and the eight bit exponent field $e_2$ are removed from $f_0$, leaving a 25 bit adjusted mantissa $m_2$.

Processing of the remaining mantissa $m_3$ continues downward with the introduction of two control variables, $K_3$ and $L_3$ to the adder 130. $L_3$ and $K_3$ respectively represent the least significant bit $m_3[0]$ and the second least significant bit $m_3[1]$ of the mantissa $m_3$ that serves as an input to the adder stage 114.

A control variable for the FADD 100, ADD, is calculated by applying the Boolean equivalence function to the sign bits $s_1$, and $s_0$, so that when $s_1$ and $s_0$ are both false or are both true, the floating point numbers $f_0$ and $f_1$ have the same sign, an addition operation is being performed, and ADD is true, that is, is equal to a logic one. Similarly, when $s_1$ and $s_0$ are different valued, a subtraction operation is being performed, and ADD is false, that is, is equal to a logic zero. The inverter 110 is provided to complement the ADD control variable to produce the SUB control variable which is input to the complement stage 112 and the adder 132.

Processing continues and the right shifter 108 receives and shifts the bits of the 25 bit mantissa $m_2$ to the right according to the value of the following control variable, RSHIFT, where $$RSHIFT = e_3 - e_2.$$

Accordingly, if RSHIFT is equal to zero, the mantissa $m_2$ is not shifted. The right shifter 108 produces a 25 bit mantissa $m_4$ as well as a series of control variables $K_4$, $L_4$, $G_4$, $R_4$, and $S_4$. TABLE I is a truth table for generation of $K_4$, $L_4$, $G_4$, $R_4$, and $S_4$ within the right shifter 108 given the value of the control variable RSHIFT. For example, if RSHIFT is equal to 23, then $K_4$ is equal to the most significant bit $m_2[24]$ of the mantissa $m_2$, that is, $K_4$ is False. The control variables $L_4$ and $K_4$ respectively represent the least significant bit $m_4[0]$ and the second least significant bit $m_4[1]$ of the mantissa $m_4$.

TABLE I

Truth Table for Generation of $J_4$, $K_4$, $L_4$, $G_4$, $R_4$ and $S_4$ within Right Shifters 108, 208 (FIGS. 1 and 2) where | = OR; and $m_2$[i] is the ith digit of $m_2$

| RSHIFT | $J_4$ | $K_4$ | $L_4$ | $G_4$ | $R_4$ | $S_4$ |
|---|---|---|---|---|---|---|
| 0 | False | $m_2$[1] | $m_2$[0] | False | False | False |
| 1 | False | $m_2$[2] | $m_2$[1] | $m_2$[0] | False | False |
| 2 | False | $m_2$[3] | $m_2$[2] | $m_2$[1] | $m_2$[0] | False |
| 3 | False | $m_2$[4] | $m_2$[3] | $m_2$[2] | $m_2$[1] | $m_2$[0] |
| 4 | False | $m_2$[5] | $m_2$[4] | $m_2$[3] | $m_2$[2] | ($m_2$[1]\|$m_2$[0]) |
| 5 | False | $m_2$[6] | $m_2$[5] | $m_2$[4] | $m_2$[3] | ($m_2$[2]\|$m_2$[1]\|$m_2$[0]) |
| 6 | False | $m_2$[7] | $m_2$[6] | $m_2$[5] | $m_2$[4] | ($m_2$[3]\| ... \|$m_2$[0]) |
| 7 | False | $m_2$[8] | $m_2$[7] | $m_2$[6] | $m_2$[5] | ($m_2$[4]\| ... \|$m_2$[0]) |
| 8 | False | $m_2$[9] | $m_2$[8] | $m_2$[7] | $m_2$[6] | ($m_2$[5]\| ... \|$m_2$[0]) |
| 9 | False | $m_2$[10] | $m_2$[9] | $m_2$[8] | $m_2$[7] | ($m_2$[6]\| ... \|$m_2$[0]) |
| 10 | False | $m_2$[11] | $m_2$[10] | $m_2$[9] | $m_2$[8] | ($m_2$[7]\| ... \|$m_2$[0]) |
| 11 | False | $m_2$[12] | $m_2$[11] | $m_2$[10] | $m_2$[9] | ($m_2$[8]\| ... \|$m_2$[0]) |
| 12 | False | $m_2$[13] | $m_2$[12] | $m_2$[11] | $m_2$[10] | ($m_2$[9]\| ... \|$m_2$[0]) |
| 13 | False | $m_2$[14] | $m_2$[13] | $m_2$[12] | $m_2$[11] | ($m_2$[10]\| ... \|$m_2$[0]) |
| 14 | False | $m_2$[15] | $m_2$[14] | $m_2$[13] | $m_2$[12] | ($m_2$[11]\| ... \|$m_2$[0]) |
| 15 | False | $m_2$[16] | $m_2$[15] | $m_2$[14] | $m_2$[13] | ($m_2$[12]\| ... \|$m_2$[0]) |
| 16 | False | $m_2$[17] | $m_2$[16] | $m_2$[15] | $m_2$[14] | ($m_2$[13]\| ... \|$m_2$[0]) |
| 17 | False | $m_2$[18] | $m_2$[17] | $m_2$[16] | $m_2$[15] | ($m_2$[14]\| ... \|$m_2$[0]) |
| 18 | False | $m_2$[19] | $m_2$[18] | $m_2$[17] | $m_2$[16] | ($m_2$[15]\| ... \|$m_2$[0]) |
| 19 | False | $m_2$[20] | $m_2$[19] | $m_2$[18] | $m_2$[17] | ($m_2$[16]\| ... \|$m_2$[0]) |
| 20 | False | $m_2$[21] | $m_2$[20] | $m_2$[19] | $m_2$[18] | ($m_2$[17]\| ... \|$m_2$[0]) |
| 21 | False | $m_2$[22] | $m_2$[21] | $m_2$[20] | $m_2$[19] | ($m_2$[18]\| ... \|$m_2$[0]) |
| 22 | False | $m_2$[23] | $m_2$[22] | $m_2$[21] | $m_2$[20] | ($m_2$[19]\| ... \|$m_2$[0]) |
| 23 | False | False | $m_2$[23] | $m_2$[22] | $m_2$[21] | ($m_2$[20]\| ... \|$m_2$[0]) |
| 24 | False | False | False | $m_2$[23] | $m_2$[22] | ($m_2$[21]\| ... \|$m_2$[0]) |
| 25 | False | False | False | False | $m_2$[23] | ($m_2$[22]\| ... \|$m_2$[0]) |
| 26 | False | False | False | False | False | ($m_2$[23]\| ... \|$m_2$[0]) |
| ≦27 | False | False | False | False | False | ($m_2$[23]\| ... \|$m_2$[0]) |

At the complement stage 112, if SUB is False, then ADD is True and an addition is being performed and none of the inputs to the complement stage 112 are complemented. If, however, SUB is True, each binary digit of the mantissa $m_4$ as well as each of the control variables $K_4$, $L_4$, $G_4$, $R_4$, and $S_4$ are complemented by the complement stage 112. The operation of the complement stage 112 is summarized as follows:

$m_6$={$m_6$[24], $m_6$[23], ..., $m_6$[1], $m_6$[0]}={$m_4$[24]^SUB, $m_4$[23]^SUB, ..., $m_4$[2]^SUB, $m_4$[1]^SUB},
$K_6$=$K_4$^SUB=$m_4$[1]^SUB=$m_6$[1],
$L_6$=$L_4$^SUB=$m_4$[0]^SUB=$m_6$[0],
$G_6$=$G_4$^SUB,
$R_6$=$R_4$^SUB, and
$S_6$=$S_4$^SUB where ^ represents the Boolean exclusive-or operation.

The 25 bit mantissa $m_6$ produced by the complement stage 112 serves as another input to the adder stage 114. The control variables $K_6$ and $L_6$ are input to the adder 130 and the control variables $G_6$, $R_6$, and $S_6$ are input the adder 132.

TABLE II is a truth table for generation of Cin, $G_8$, $R_8$, and $S_8$ within the adder 132 given the values of the control variable SUB and the input control variables $G_6$, $R_6$, and $S_6$. For example, if SUB is True, and $G_6$, $R_6$, and $S_6$ are all True, then $G_8$, $R_8$, and $S_8$ are all False and the overflow bit Cin is True. The signal Cin serves as a carry input to the adder stage 114 as well as the adder 130.

TABLE II

Truth Table for Generation of Cin $G_8$, $R_8$, and $S_8$ within Adder 132 (FIG. 1)

| SUB =~ ADD (Adder 132 Carry In Bit) | $G_6$ $R_6$ $S_6$ (Adder 132 Input) | | | $G_8$ $R_8$ $S_8$ (Adder 132 Sum) | | | Cin (Adder 132 Carry Out Bit) |
|---|---|---|---|---|---|---|---|
| False | False | False | False | False | False | False | False |
| False | False | False | True | False | False | True | False |
| False | False | True | False | False | True | False | False |
| False | False | True | True | False | True | True | False |
| False | True | False | False | True | False | False | False |
| False | True | False | True | False | False | True | False |
| False | True | True | False | True | True | False | False |
| False | True | True | True | True | True | True | False |
| True | False | False | False | False | False | True | False |
| True | False | False | True | False | True | False | False |
| True | False | True | False | False | True | True | False |
| True | False | True | True | True | False | False | False |
| True | True | False | False | True | False | True | False |
| True | True | False | True | True | True | False | False |

TABLE II-continued

Truth Table for Generation of Cin $G_8$, $R_8$, and $S_8$ within Adder 132 (FIG. 1)

| SUB =~ ADD (Adder 132 Carry In Bit) | $G_6$ $R_6$ $S_6$ (Adder 132 Input) | $G_8$ $R_8$ $S_8$ (Adder 132 Sum) | Cin (Adder 132 Carry Out Bit) |
|---|---|---|---|
| True | True True False | True True True | False |
| True | True True True | False False False | True |

Cin = SUB & $G_6$ & $R_6$ & $S_6$ where & = AND; and ~ = NOT

TABLE III is a truth table for generation of $K_8$ and $L_8$ within the adder 130 given the values of Cin from the adder 132 and of the pairs of input control variables $K_3$, $L_3$ and $K_6$, $L_6$. For example, if Cin is False, and $K_3$, $L_3$ and $K_6$, $L_6$ are all True, then $K_8$ and $L_8$ are True and False, respectively. The control variables $K_8$ and $L_8$ join with $G_8$, $R_8$, and $S_8$ to form a 5 bit word that is input to the left shifter 134.

TABLE III

Truth Table for Generation of $K_8$ and $L_8$ within Adder 130 (FIG. 1)

| Cin (Adder 130 Carry In Bit) | $K_3$ $L_3$ (Adder 130 First Input) | $K_6$ $L_6$ (Adder 130 Second Input) | $K_8$ $L_8$ (Adder 130 Sum Input) |
|---|---|---|---|
| 0 | 0 0 | 0 0 | 0 0 |
| 0 | 0 0 | 0 1 | 0 1 |
| 0 | 0 0 | 1 0 | 1 0 |
| 0 | 0 0 | 1 1 | 1 1 |
| 0 | 0 1 | 0 0 | 0 1 |
| 0 | 0 1 | 0 1 | 1 0 |
| 0 | 0 1 | 1 0 | 1 1 |
| 0 | 0 1 | 1 1 | 0 0 |
| 0 | 1 0 | 0 0 | 1 0 |
| 0 | 1 0 | 0 1 | 1 1 |
| 0 | 1 0 | 1 0 | 0 0 |
| 0 | 1 0 | 1 1 | 0 1 |
| 0 | 1 1 | 0 0 | 1 1 |
| 0 | 1 1 | 0 1 | 0 0 |
| 0 | 1 1 | 1 0 | 0 1 |
| 0 | 1 1 | 1 1 | 1 0 |
| 1 | 0 0 | 0 0 | 0 1 |
| 1 | 0 0 | 0 1 | 1 0 |
| 1 | 0 0 | 1 0 | 1 1 |
| 1 | 0 0 | 1 1 | 0 0 |
| 1 | 0 1 | 0 0 | 1 0 |
| 1 | 0 1 | 0 1 | 1 1 |
| 1 | 0 1 | 1 0 | 0 0 |
| 1 | 0 1 | 1 1 | 0 1 |
| 1 | 1 0 | 0 0 | 1 1 |
| 1 | 1 0 | 0 1 | 0 0 |
| 1 | 1 0 | 1 0 | 0 1 |
| 1 | 1 0 | 1 1 | 1 0 |
| 1 | 1 1 | 0 0 | 0 0 |
| 1 | 1 1 | 0 1 | 0 1 |
| 1 | 1 1 | 1 0 | 1 0 |
| 1 | 1 1 | 1 1 | 1 1 |

The adder stage 114 receives the 25 bit mantissa $m_3$, the 25 bit mantissa $m_6$, and the Cin bit signal and adds these together to produce a 25 bit mantissa $m_7$. The carry out bit of the adder stage 114 is discarded and is not used to obtain the final result of the FADD 100.

Processing continues to the normalizer stage 116, which receives the 25 bit mantissa $m_7$ and the control variable $G_8$ from the adder 132. The count up to $e_3$ leading zeros stage 120 examines each bit of the mantissa $m_7$ beginning with the most significant bit $m_7[24]$ and counts logic zeros until the stage 120 counts $e_3$ logic zeros, until the stage 120 encounters a logic one, or until the 25 bits of the mantissa $m_7$ are exhausted, whichever comes first. The stage 120 outputs a control variable LSHIFT that is equal to the number of counted leading logic zeros in the mantissa $m_7$. The left shifter 118 receives and shifts the bits of the 25 bit mantissa $m_7$ to the left to produce a 25 bit mantissa $m_{11}$ according to the value of the control variable, LSHIFT. Accordingly, if LSHIFT is equal to zero, the mantissa $m_7$ is not shifted and the mantissa $m_{11}$ equals the mantissa $m_7$. If LSHIFT is equal to one, then the control variable $G_8$ is shifted in to become the least significant bit of the mantissa $m_{11}$. If LSHIFT is greater than one, the control variable $G_8$ is shifted in, followed by LSHIFT−1 logic zeros, to form the latter part of the mantissa $m_{10}$.

Returning to the left shifter 134, the shifter 134 receives the 5 bit word consisting of the control variables $K_8$, $L_8$, $G_8$, $R_8$, and $S_8$ and shifts the bits of the 5 bit word to the left to produce a 5 bit word that consists of the control variables $K_{10}$, $L_{10}$, $G_{10}$, $R_{10}$, and $S_{10}$, according to the value of the control variable, LSHIFT. TABLE IV is a truth table for generation of $K_{10}$, $L_{10}$, $G_{10}$, $R_{10}$, and $S_{10}$ within the left shifter 134 given the values of the control variable LSHIFT and the input control variables $K_8$, $L_8$, $G_8$, $R_8$, and $S_8$. For example, if LSHIFT is equal to three, then $K_{10}$ is equal to $R_8$, $L_{10}$ is equal to $S_8$, and $G_{10}$, $R_{10}$, and $S_{10}$ are all False. The 5 bit word of $K_{10}$, $L_{10}$, $G_{10}$ $R_{10}$ $S_{10}$ serves as the input to the round control logic 126.

TABLE IV

Truth Table for Generation of $K_{10}$, $L_{10}$, $G_{10}$, $R_{10}$ and $S_{10}$ within Left Shifter 134 (FIG. 1) where | = OR

| LEFT SHIFT (integer value of 8 bit number) | $K_{10}$ | $L_{10}$ | $G_{10}$ | $R_{10}$ | $S_{10}$ |
|---|---|---|---|---|---|
| 0 | $K_8$ | $L_8$ | $G_8$ | $R_8$ | $S_8$ |
| 1 | $L_8$ | $G_8$ | $R_8$ | $S_8$ | False |
| 2 | $G_8$ | $R_8$ | $S_8$ | False | False |
| 3 | $R_8$ | $S_8$ | False | False | False |
| 4 | $S_8$ | False | False | False | False |
| 5 to $e_3$ | False | False | False | False | False |

Next, the round control logic 126 receives the control variables $K_{10}$, $L_{10}$, $G_{10}$, $R_{10}$, and $S_{10}$. TABLE V is a truth table for generation of the control signal increment (INC) within the round control logic 126 given the values of the input control variables $K_{10}$, $L_{10}$, $G_{10}$, $R_{10}$, and $S_{10}$. For example, if $K_{10}$ and $S_{10}$ are False and $L_{10}$, $G_{10}$, and $R_{10}$ are True, then INC is True. The signal INC serves as a carry input to the rounding stage 128.

TABLE V

Truth Table for Generation of INC within Round Control Logic 126 (FIG. 1)

| $K_{10}$ | $L_{10}$ | $G_{10}$ | $R_{10}$ | $S_{10}$ | INC |
|---|---|---|---|---|---|
| False | False | False | False | False | False |
| False | False | False | False | True | False |
| False | False | False | True | False | False |
| False | False | False | True | True | False |
| False | False | True | False | False | False |
| False | False | True | False | True | False |
| False | False | True | True | False | False |
| False | False | True | True | True | False |
| False | True | False | False | False | True |
| False | True | False | False | True | True |
| False | True | False | True | False | True |
| False | True | False | True | True | True |
| False | True | True | False | False | True |
| False | True | True | False | True | True |
| False | True | True | True | False | True |
| False | True | True | True | True | True |
| True | False | False | False | False | False |
| True | False | False | False | True | False |
| True | False | False | True | False | False |
| True | False | False | True | True | False |
| True | False | True | False | False | False |
| True | False | True | False | True | False |
| True | False | True | True | False | False |
| True | False | True | True | True | True |
| True | True | False | False | False | True |
| True | True | False | False | True | True |
| True | True | False | True | False | True |
| True | True | False | True | True | True |
| True | True | True | False | False | True |
| True | True | True | False | True | True |
| True | True | True | True | False | True |
| True | True | True | True | True | True |

Processing of the mantissa ml continues downward with the removal of the least significant bit $m_{11}[0]$ from the mantissa $m_{11}$ to produce a 24 bit mantissa $m_{12}$. The rounding stage 128 adds the signal INC to the mantissa $m_{12}$ to produce a 24 bit mantissa $m_{13}$. The rounding stage 128 is in effect an additional adder stage that follows the normalizer stage 116.

Next, the most significant bit of the 24 bit mantissa $m_{13}$ is removed to produce the 23 bit mantissa m of the floating point number $f_{result}$ output of the FADD 100. The most significant bit serves as an input to the increment adder stage 124.

The subtract stage 122 subtracts the 8 bit control variable LSHIFT from the 8 bit exponent field value $e_3$ from the unpack stage 104 and produces an 8 bit output that is in turn sent to the increment adder stage 124. The increment adder stage 124 adds the 8 bit output of the subtract stage 122 to the one bit most significant bit described above to produce the 8 bit exponent field e of the floating point number $f_{result}$. The sign bit s1 of the floating point number $f_1$ becomes the sign bit s of the floating point number $f_{result}$. All parts s, e, and m of the floating point number $f_{result}$ are thus known and processing of the FADD 100 terminates.

Operation of the Second Embodiment

Processing of the exemplary FADD 200 shown in FIG. 2 according to the second embodiment is now described. The swapper stage 102 receives two floating point numbers, $i_1$ and $i_0$, and compares the unsigned magnitude of the numbers to determine their relative size. The number whose magnitude is less than or equal to the unsigned magnitude of the other number is designated $f_0$ and is processed on the right-hand side of FIG. 2. The greater or equivalent other number is designated $f_1$ and is processed on the left-hand side of FIG. 2. The floating point number $f_0$ includes a sign bit $s_0$ (bit 31 of 32), an eight bit exponent field $e_0$ (bits 30–23 of 32), and a mantissa or significant field (bits 22–0 of 32). The floating point number $f_1$ includes a sign bit $s_1$ (bit 31 of 32), an eight bit exponent field $e_1$ (bits 30–23 of 32), and a mantissa or significant field (bits 22–0 of 32).

The floating point numbers $f_1$ and $f_0$ are processed by the unpack stages 104, 106, respectively, as described above, so that on the left-hand side of FIG. 2, the sign bit $s_1$ and the eight bit exponent field $e_3$ are removed from $f_1$, leaving a 25 bit adjusted mantissa $m_3$, and on the right-hand side of FIG. 2, the sign bit so and the eight bit exponent field $e_2$ are removed from $f_0$, leaving a 25 bit adjusted mantissa $m_2$.

Processing of the remaining mantissa $m_3$ continues downward with the introduction of three control variables, $J_3$, $K_3$, and $L_3$ to the round control logic 226. $J_3$, $L_3$, and $K_3$ respectively represent the most significant bit $m_3[24]$, the least significant bit $m_3[0]$, and the second least significant bit $m_3[1]$ of the mantissa $m_3$ that serves as an input to the adder stage 214.

A control variable for the FADD 200, ADD, is calculated by applying the Boolean equivalence function to the sign bits $s_1$ and $s_0$, so that when $s_1$ and $s_0$ are both false or are both true, the floating point numbers $f_0$ and $f_1$ have the same sign, an addition operation is being performed, and ADD is true, that is, is equal to a logic one. Similarly, when $s_1$ and $s_0$ are different valued, a subtraction operation is being performed, and ADD is false, that is, is equal to a logic zero. The inverter 210 is provided to complement the ADD control variable to produce the SUB control variable which is input to the complement stage 212 and the round control logic 226.

Processing continues and the right shifter 208 receives and shifts the bits of the 25 bit mantissa $m_2$ to the right according to the value of the following control variable, RSHIFT, where $$RSHIFT = e_3 - e_2.$$

Accordingly, if RSHIFT is equal to zero, the mantissa $m_2$ is not shifted. The right shifter 208 produces a 25 bit mantissa $m_4$ as well as a series of control variables $J_4$, $K_4$, $L_4$, $G_4$, $R_4$, and $S_4$. TABLE I is a truth table for generation of $J_4$, $K_4$, $L_4$, $G_4$, $R_4$, and $S_4$ within the right shifter 208 given the value of the control variable RSHIFT. For example, if RSHIFT is equal to 23, then $K_4$ is equal to the most significant bit $m_2[24]$ of the mantissa $m_2$, that is, $K_4$ is False. The control variables $J_4$, $L_4$, and $K_4$ respectively represent the most significant bit $m_4[24]$, the least significant bit $m_4[0]$, and the second least significant bit $m_4[1]$ of the mantissa $m_4$.

At the complement stage 212, if SUB is False, then ADD is True and an addition is being performed and none of the inputs to the complement stage 212 are complemented. If, however, SUB is True, each binary digit of the mantissa $m_4$ as well as each of the control variables $J_4$, $K_4$, $L_4$, $G_4$, $R_4$, and $S_4$ are complemented by the complement stage 212. The operation of the complement stage 212 is summarized as follows:

$m_6 = \{m_6[24], m_6[23], \ldots, m_6[1], m_6[0]\} = \{m_4[24]\text{\textasciicircum}SUB, m_4[23]\text{\textasciicircum}SUB, \ldots, m_4[2]\text{\textasciicircum}SUB, m_4[1]\text{\textasciicircum}SUB\}$, $J_6 = J_4\text{\textasciicircum}SUB = m_4[24]\text{\textasciicircum}SUB = m_6[24]$, $K_6 = K_4\text{\textasciicircum}SUB = m_4[1]\text{\textasciicircum}SUB = m_6[1]$, $L_6 = L_4\text{\textasciicircum}SUB = m_4[0]\text{\textasciicircum}SUB = m_6[0]$, $G_6 = G_4\text{\textasciicircum}SUB$, $R_6 = R_4\text{\textasciicircum}SUB$, and $S_6 = S_4\text{\textasciicircum}SUB$ where ^ represents the Boolean exclusive-or operation.

The 25 bit mantissa $m_6$ produced by the complement stage 212 serves as another input to the adder stage 214. The control variable outputs $J_6$, $K_6$, $L_6$, $G_6$, $R_6$, and $S_6$ of the complement stage 212 are input to the round control logic 226.

TABLE VI is a truth table for generation of internal control variables L and K within the round control logic 226 given the values of the input control variables $K_3$, $K_6$, $L_3$, and $L_6$. For example, if $K_3$, $K_6$, $L_3$, and $L_6$ are all true, then L and K are False and True, respectively.

TABLE VI

Truth Table for Generation of L and K within Round Control Logic 226 (FIG. 2);
K = $K_3$ ^ $K_6$ ^ ($L_3$ & $L_6$);
L = $L_3$ ^ $L_6$
where ^ = EXCLUSIVE-OR; and & = AND

| $K_3$ | $K_6$ | $L_3$ | $L_6$ | L | K |
|---|---|---|---|---|---|
| False | False | False | False | False | False |
| False | False | False | True | True | False |
| False | False | True | False | True | False |
| False | False | True | True | False | True |
| False | True | False | False | False | True |
| False | True | False | True | True | True |
| False | True | True | False | True | True |
| False | True | True | True | False | False |
| True | False | False | False | False | True |
| True | False | False | True | True | True |
| True | False | True | False | True | True |
| True | False | True | True | False | False |
| True | True | False | False | False | False |
| True | True | False | True | True | False |
| True | True | True | False | True | False |
| True | True | True | True | False | True |

TABLE VII is a truth table for generation of the control variables GEN, PROP and $G_8$ within the round control logic 226 given the values of the internal control variables K and L shown in TABLE VI and of the input control variables SUB, $J_3$, $J_6$, $G_6$, $R_6$, and $S_6$. For example, if $J_3$, $J_6$, SUB, K, L, $G_6$, $R_6$, and $S_6$ are all True, then GEN and PROP are both True and $G_8$ is False. The control variables GEN and PROP are input to the carry logic 228. $G_8$ serves as an input to the left shifter 218 of the normalizer stage 216. TABLE VII also explains the generation of the signal Cin within the carry logic 228 given the values of the control variables GEN and PROP from the round control logic 226. Similarly, TABLE VIII is a truth table for generation of the signal Cin within the carry logic 228 given the values of the control variables GEN and PROP and the signal C23 from the adder stage 214. C23 is the second most significant carry bit of the adder stage 214, with C24 or Cout representing the most significant carry bit of the adder stage 214. For example, if GEN is False and PROP is True, then Cin follows the value of C23. If GEN and PROP are both False, then Cin is False. Finally, if GEN is True, then Cin is True.

TABLE VII

Truth Table for Generation of GEN, PROP, and $G_8$ within Round Control Logic 226 and Cin within Carry Logic 228 (FIG. 2);
GEN = (~SUB & ~$G_6$ & (L |~$R_6$|~$S_6$))|
(SUB & $G_6$ & ($R_6$|$S_6$))|(~$J_6$ & ~SUB & K & L);
PROP = (~$J_3$ & ~SUB & L & (K|~$R_6$|~$S_6$))|
(L & ~$G_6$ & $R_6$ & $S_6$)|(SUB &
$G_6$); $G_8$ = (~$G_6$ & $R_6$)|($G_6$ & ~$R_6$ & ~$S_6$)
where & = AND; | = OR; and ~ NOT; DC = Don't Care

| $J_3$ | $J_6$ | SUB | K | L | $G_6$ | $R_6$ | $S_6$ | GEN | PROP | $G_8$ | Cin |
|---|---|---|---|---|---|---|---|---|---|---|---|
| False | False | False | False | False | False | False | False | False | False | DC | False |
| False | False | False | False | False | False | False | True | False | False | DC | False |
| False | False | False | False | False | False | True | False | False | False | DC | False |
| False | False | False | False | False | False | True | True | False | False | DC | False |
| False | False | False | False | False | True | False | False | False | False | DC | False |
| False | False | False | False | False | True | False | True | False | False | DC | False |
| False | False | False | False | False | True | True | False | True | False | DC | True |
| False | False | False | False | False | True | True | True | True | False | DC | True |
| False | False | False | False | True | False | False | False | False | False | DC | False |
| False | False | False | False | True | False | False | True | False | True | DC | C23 |
| False | False | False | False | True | False | True | False | False | True | DC | C23 |
| False | False | False | False | True | False | True | True | False | True | DC | C23 |
| False | False | False | False | True | True | False | False | False | True | DC | True |
| False | False | False | False | True | True | False | True | False | True | DC | True |
| False | False | False | False | True | True | True | False | True | True | DC | True |
| False | False | False | False | True | True | True | True | True | True | DC | True |
| False | False | False | True | False | False | False | False | False | False | DC | False |
| False | False | False | True | False | False | False | True | False | False | DC | False |
| False | False | False | True | False | False | True | False | False | False | DC | False |

TABLE VII-continued

Truth Table for Generation of GEN, PROP, and $G_8$ within Round
Control Logic 226 and Cin within Carry Logic 228 (FIG. 2);
GEN = (~SUB & ~$G_6$ & (L |~$R_6$|~$S_6$))|
(SUB & $G_6$ & ($R_6$|$S_6$))|(~$J_6$ & ~SUB & K & L);
PROP = (~$J_3$ & ~SUB & L & (K|~$R_6$|~$S_6$))|
(L & ~$G_6$ & $R_6$ & $S_6$)|(SUB &
$G_6$); $G_8$ = (~$G_6$ & $R_6$)|($G_6$ & ~$R_6$ & ~$S_6$)
where & = AND; | = OR; and ~ NOT; DC = Don't Care

| $J_3$ | $J_6$ | SUB | K | L | $G_6$ | $R_6$ | $S_6$ | GEN | PROP | $G_8$ | Cin |
|---|---|---|---|---|---|---|---|---|---|---|---|
| False | False | False | True | False | False | True | True | False | False | DC | False |
| False | False | False | True | False | True | False | False | False | False | DC | False |
| False | False | False | True | False | True | False | True | True | False | DC | True |
| False | False | False | True | False | True | True | False | True | False | DC | True |
| False | False | False | True | False | True | True | True | True | False | DC | True |
| False | False | False | True | True | False | False | False | True | DC | True |
| False | False | False | True | True | False | False | True | True | True | DC | True |
| False | False | False | True | True | False | True | False | True | True | DC | True |
| False | False | False | True | True | False | True | True | True | True | DC | True |
| False | False | False | True | True | True | False | False | True | True | DC | True |
| False | False | False | True | True | True | False | True | True | True | DC | True |
| False | False | False | True | True | True | True | False | True | True | DC | True |
| False | False | False | True | True | True | True | True | True | True | DC | True |
| False | False | True | False | False | False | False | False | False | False | False | False |
| False | False | True | False | False | False | False | True | False | False | False | False |
| False | False | True | False | False | False | True | False | False | False | True | False |
| False | False | True | False | False | False | True | True | False | False | True | False |
| False | False | True | False | False | True | False | False | False | True | True | C23 |
| False | False | True | False | False | True | False | True | True | True | False | True |
| False | False | True | False | False | True | True | False | True | True | False | True |
| False | False | True | False | False | True | True | True | True | True | False | True |
| False | False | True | False | True | False | False | False | False | False | False | False |
| False | False | True | False | True | False | False | True | False | False | False | False |
| False | False | True | False | True | False | True | False | False | False | True | False |
| False | False | True | False | True | False | True | True | False | True | True | C23 |
| False | False | True | False | True | True | False | False | False | True | True | C23 |
| False | False | True | False | True | True | False | True | True | True | False | True |
| False | False | True | False | True | True | True | False | True | True | False | True |
| False | False | True | False | True | True | True | True | True | True | False | True |
| False | False | True | True | False | False | False | False | False | False | False | False |
| False | False | True | True | False | False | False | True | False | False | False | False |
| False | False | True | True | False | False | True | False | False | False | True | False |
| False | False | True | True | False | False | True | True | False | False | True | False |
| False | False | True | True | False | True | False | False | False | True | True | C23 |
| False | False | True | True | False | True | False | True | True | True | False | True |
| False | False | True | True | False | True | True | False | True | True | False | True |
| False | False | True | True | False | True | True | True | True | True | False | True |
| False | False | True | True | True | False | False | False | False | False | False | False |
| False | False | True | True | True | False | False | True | False | False | False | False |
| False | False | True | True | True | False | True | False | False | False | True | False |
| False | False | True | True | True | False | True | True | False | True | True | C23 |
| False | False | True | True | True | True | False | False | False | True | True | C23 |
| False | False | True | True | True | True | False | True | True | True | False | True |
| False | False | True | True | True | True | True | False | True | True | False | True |
| False | False | True | True | True | True | True | True | True | True | False | True |
| False | True | False | False | False | False | False | False | False | False | DC | False |
| False | True | False | False | False | False | False | True | False | False | DC | False |
| False | True | False | False | False | False | True | False | False | False | DC | False |
| False | True | False | False | False | False | True | True | False | False | DC | False |
| False | True | False | False | False | True | False | False | False | False | DC | False |
| False | True | False | False | False | True | False | True | True | False | DC | True |
| False | True | False | False | False | True | True | False | True | False | DC | True |
| False | True | False | False | False | True | True | True | True | False | DC | True |
| False | True | False | False | True | False | False | False | False | False | DC | False |
| False | True | False | False | True | False | False | True | False | True | DC | C23 |
| False | True | False | False | True | False | True | False | False | True | DC | C23 |
| False | True | False | False | True | False | True | True | False | True | DC | C23 |
| False | True | False | False | True | True | False | False | False | True | DC | True |
| False | True | False | False | True | True | False | True | True | True | DC | True |
| False | True | False | False | True | True | True | False | True | True | DC | True |
| False | True | False | False | True | True | True | True | True | True | DC | True |
| False | True | False | True | False | False | False | False | False | False | DC | False |
| False | True | False | True | False | False | False | True | False | False | DC | False |
| False | True | False | True | False | False | True | False | False | False | DC | False |
| False | True | False | True | False | False | True | True | False | False | DC | False |
| False | True | False | True | False | True | False | False | False | False | DC | False |
| False | True | False | True | False | True | False | True | True | False | DC | True |
| False | True | False | True | False | True | True | False | True | False | DC | True |

TABLE VII-continued

Truth Table for Generation of GEN, PROP, and $G_8$ within Round
Control Logic 226 and Cin within Carry Logic 228 (FIG. 2);
GEN = (~SUB & ~$G_6$ & (L |~$R_6$|~$S_6$))|
(SUB & $G_6$ & ($R_6$|$S_6$))|(~$J_6$ & ~SUB & K & L);
PROP = (~$J_3$ & ~SUB & L & (K|~$R_6$|~$S_6$))|
(L & ~$G_6$ & $R_6$ & $S_6$)|(SUB &
$G_6$); $G_8$ = (~$G_6$ & $R_6$)|($G_6$ & ~$R_6$ & ~$S_6$)
where & = AND; | = OR; and ~ NOT; DC = Don't Care

| $J_3$ | $J_6$ | SUB | K | L | $G_6$ | $R_6$ | $S_6$ | GEN | PROP | $G_8$ | Cin |
|---|---|---|---|---|---|---|---|---|---|---|---|
| False | True | False | True | False | True | True | True | True | False | DC | True |
| False | True | False | True | True | False | False | False | False | True | DC | C23 |
| False | True | False | True | True | False | False | True | False | True | DC | C23 |
| False | True | False | True | True | False | True | False | False | True | DC | C23 |
| False | True | False | True | True | False | True | True | False | True | DC | C23 |
| False | True | False | True | True | True | False | False | True | True | DC | True |
| False | True | False | True | True | True | False | True | True | True | DC | True |
| False | True | False | True | True | True | True | False | True | True | DC | True |
| False | True | False | True | True | True | True | True | True | True | DC | True |
| False | True | True | False | False | False | False | False | False | False | False | False |
| False | True | True | False | False | False | False | True | False | False | False | False |
| False | True | True | False | False | False | True | False | False | False | True | False |
| False | True | True | False | False | False | True | True | False | False | True | False |
| False | True | True | False | False | True | False | False | False | True | True | C23 |
| False | True | True | False | False | True | False | True | True | True | False | True |
| False | True | True | False | False | True | True | False | True | True | False | True |
| False | True | True | False | False | True | True | True | True | True | False | True |
| False | True | True | False | True | False | False | False | False | False | False | False |
| False | True | True | False | True | False | False | True | False | False | False | False |
| False | True | True | False | True | False | True | False | False | False | True | False |
| False | True | True | False | True | False | True | True | False | True | True | C23 |
| False | True | True | False | True | True | False | False | True | True | False | C23 |
| False | True | True | False | True | True | False | True | True | True | False | True |
| False | True | True | False | True | True | True | False | True | True | False | True |
| False | True | True | False | True | True | True | True | True | True | False | True |
| False | True | True | True | False | False | False | False | False | False | False | False |
| False | True | True | True | False | False | False | True | False | False | False | False |
| False | True | True | True | False | False | True | False | False | False | True | False |
| False | True | True | True | False | False | True | True | False | False | True | False |
| False | True | True | True | False | True | False | False | False | True | True | C23 |
| False | True | True | True | False | True | False | True | True | True | False | True |
| False | True | True | True | False | True | True | False | True | True | False | True |
| False | True | True | True | False | True | True | True | True | True | False | True |
| False | True | True | True | True | False | False | False | False | False | False | False |
| False | True | True | True | True | False | False | True | False | False | False | False |
| False | True | True | True | True | False | True | False | False | False | True | False |
| False | True | True | True | True | False | True | True | False | True | True | C23 |
| False | True | True | True | True | True | False | False | True | True | False | C23 |
| False | True | True | True | True | True | False | True | True | True | False | True |
| False | True | True | True | True | True | True | False | True | True | False | True |
| False | True | True | True | True | True | True | True | True | True | False | True |
| True | False | False | False | False | False | False | False | False | False | DC | False |
| True | False | False | False | False | False | False | True | False | False | DC | False |
| True | False | False | False | False | False | True | False | False | False | DC | False |
| True | False | False | False | False | False | True | True | False | False | DC | False |
| True | False | False | False | False | True | False | False | False | False | DC | False |
| True | False | False | False | False | True | False | True | False | True | DC | True |
| True | False | False | False | False | True | True | False | True | False | DC | True |
| True | False | False | False | False | True | True | True | True | False | DC | True |
| True | False | False | False | True | False | False | False | False | False | DC | False |
| True | False | False | False | True | False | False | True | False | False | DC | False |
| True | False | False | False | True | False | True | False | False | False | DC | False |
| True | False | False | False | True | False | True | True | False | False | DC | False |
| True | False | False | False | True | True | False | False | False | True | True | DC | True |
| True | False | False | False | True | True | False | True | True | False | DC | True |
| True | False | False | False | True | True | True | False | True | False | DC | True |
| True | False | False | False | True | True | True | True | True | False | DC | True |
| True | False | False | True | False | False | False | False | False | False | DC | False |
| True | False | False | True | False | False | False | True | False | False | DC | False |
| True | False | False | True | False | False | True | False | False | False | DC | False |
| True | False | False | True | False | False | True | True | False | False | DC | False |
| True | False | False | True | False | True | False | False | False | False | DC | False |
| True | False | False | True | False | True | False | True | False | True | DC | True |
| True | False | False | True | False | True | True | False | True | False | DC | True |
| True | False | False | True | False | True | True | True | True | False | DC | True |
| True | False | False | True | True | False | False | False | False | True | DC | True |
| True | False | False | True | True | False | False | True | False | True | DC | True |
| True | False | False | True | True | False | True | False | False | True | DC | True |
| True | False | False | True | True | False | True | True | False | True | DC | True |

TABLE VII-continued

Truth Table for Generation of GEN, PROP, and $G_8$ within Round Control Logic 226 and Cin within Carry Logic 228 (FIG. 2);
$GEN = (\sim SUB\ \&\ \sim G_6\ \&\ (L\ |\sim R_6|\sim S_6))|$
$(SUB\ \&\ G_6\ \&\ (R_6|S_6))|(\sim J_6\ \&\ \sim SUB\ \&\ K\ \&\ L);$
$PROP = (\sim J_3\ \&\ \sim SUB\ \&\ L\ \&\ (K|\sim R_6|\sim S_6))|$
$(L\ \&\ \sim G_6\ \&\ R_6\ \&\ S_6)|(SUB\ \&\ G_6);\ G_8 = (\sim G_6\ \&\ R_6)|(G_6\ \&\ \sim R_6\ \&\ \sim S_6)$
where $\&$ = AND; $|$ = OR; and $\sim$ NOT; DC = Don't Care

| $J_3$ | $J_6$ | SUB | K | L | $G_6$ | $R_6$ | $S_6$ | GEN | PROP | $G_8$ | Cin |
|---|---|---|---|---|---|---|---|---|---|---|---|
| True | False | False | True | True | False | True | True | True | False | DC | True |
| True | False | False | True | True | True | False | False | True | True | DC | True |
| True | False | False | True | True | True | False | True | True | False | DC | True |
| True | False | False | True | True | True | True | False | True | False | DC | True |
| True | False | False | True | True | True | True | True | True | False | DC | True |
| True | False | True | False | False | False | False | False | False | False | False | False |
| True | False | True | False | False | False | False | True | False | False | False | False |
| True | False | True | False | False | False | True | False | False | False | True | False |
| True | False | True | False | False | False | True | True | False | False | True | False |
| True | False | True | False | False | True | False | False | True | True | False | C23 |
| True | False | True | False | False | True | False | True | True | True | False | True |
| True | False | True | False | False | True | True | False | True | True | False | True |
| True | False | True | False | False | True | True | True | True | True | False | True |
| True | False | True | False | True | False | False | False | False | False | False | False |
| True | False | True | False | True | False | False | True | False | False | False | False |
| True | False | True | False | True | False | True | False | False | False | True | False |
| True | False | True | False | True | False | True | True | False | False | True | False |
| True | False | True | False | True | True | False | False | True | True | False | C23 |
| True | False | True | False | True | True | False | True | True | True | False | C23 |
| True | False | True | False | True | True | True | False | True | True | False | True |
| True | False | True | False | True | True | True | True | True | True | False | True |
| True | False | True | False | True | True | True | True | True | True | False | True |
| True | False | True | True | False | False | False | False | False | False | False | False |
| True | False | True | True | False | False | False | True | False | False | False | False |
| True | False | True | True | False | False | True | False | False | False | True | False |
| True | False | True | True | False | False | True | True | False | False | True | False |
| True | False | True | True | False | True | False | False | True | True | False | C23 |
| True | False | True | True | False | True | False | True | True | True | False | True |
| True | False | True | True | False | True | True | False | True | True | False | True |
| True | False | True | True | False | True | True | True | True | True | False | True |
| True | False | True | True | True | False | False | False | False | False | False | False |
| True | False | True | True | True | False | False | True | False | False | False | False |
| True | False | True | True | True | False | True | False | False | False | True | False |
| True | False | True | True | True | False | True | True | True | False | True | C23 |
| True | False | True | True | True | True | False | False | True | True | False | C23 |
| True | False | True | True | True | True | False | True | True | True | False | True |
| True | False | True | True | True | True | True | False | True | True | False | True |
| True | False | True | True | True | True | True | True | True | True | False | True |
| True | True | False | False | False | False | False | False | False | False | DC | False |
| True | True | False | False | False | False | False | True | False | False | DC | False |
| True | True | False | False | False | False | True | False | False | False | DC | False |
| True | True | False | False | False | False | True | True | False | False | DC | False |
| True | True | False | False | False | True | False | False | False | False | DC | False |
| True | True | False | False | False | True | False | True | False | False | DC | True |
| True | True | False | False | False | True | True | False | False | False | DC | True |
| True | True | False | False | False | True | True | True | False | False | DC | True |
| True | True | False | False | True | False | False | False | False | False | DC | False |
| True | True | False | False | True | False | False | True | False | False | DC | False |
| True | True | False | False | True | False | True | False | False | False | DC | False |
| True | True | False | False | True | False | True | True | False | False | DC | False |
| True | True | False | False | True | True | False | False | True | True | DC | True |
| True | True | False | False | True | True | False | True | True | True | DC | True |
| True | True | False | False | True | True | True | False | True | False | DC | True |
| True | True | False | False | True | True | True | True | True | False | DC | True |
| True | True | False | True | False | False | False | False | False | False | DC | False |
| True | True | False | True | False | False | False | True | False | False | DC | False |
| True | True | False | True | False | False | True | False | False | False | DC | False |
| True | True | False | True | False | False | True | True | False | False | DC | False |
| True | True | False | True | False | True | False | False | False | False | DC | True |
| True | True | False | True | False | True | False | True | False | False | DC | True |
| True | True | False | True | False | True | True | False | False | False | DC | True |
| True | True | False | True | False | True | True | True | False | False | DC | True |
| True | True | False | True | True | False | False | False | False | False | DC | False |
| True | True | False | True | True | False | False | True | False | False | DC | False |
| True | True | False | True | True | False | True | False | False | False | DC | False |
| True | True | False | True | True | False | True | True | False | False | DC | False |
| True | True | False | True | True | True | False | False | True | True | DC | True |
| True | True | False | True | True | True | False | True | True | True | DC | True |
| True | True | False | True | True | True | True | False | True | False | DC | True |
| True | True | False | True | True | True | True | True | True | False | DC | True |

TABLE VII-continued

Truth Table for Generation of GEN, PROP, and $G_8$ within Round
Control Logic 226 and Cin within Carry Logic 228 (FIG. 2);
GEN = (~SUB & ~$G_6$ & (L |~$R_6$|~$S_6$))|
(SUB & $G_6$ & ($R_6$|$S_6$))|(~$J_6$ & ~SUB & K & L);
PROP = (~$J_3$ & ~SUB & L & (K|~$R_6$|~$S_6$))|
(L & ~$G_6$ & $R_6$ & $S_6$)|(SUB &
$G_6$); $G_8$ = (~$G_6$ & $R_6$)|($G_6$ & ~$R_6$ & ~$S_6$)
where & = AND; | = OR; and ~ NOT; DC = Don't Care

| $J_3$ | $J_6$ | SUB | K | L | $G_6$ | $R_6$ | $S_6$ | GEN | PROP | $G_8$ | Cin |
|---|---|---|---|---|---|---|---|---|---|---|---|
| True | True | False | True | True | True | True | True | True | False | DC | True |
| True | True | True | False | False | False | False | False | False | False | False | False |
| True | True | True | False | False | False | False | True | False | False | False | False |
| True | True | True | False | False | False | True | False | False | False | True | False |
| True | True | True | False | False | False | True | True | False | False | True | False |
| True | True | True | False | False | True | False | False | False | True | True | C23 |
| True | True | True | False | False | True | False | True | True | True | False | True |
| True | True | True | False | False | True | True | False | True | True | False | True |
| True | True | True | False | False | True | True | True | True | True | False | True |
| True | True | True | False | True | False | False | False | False | False | False | False |
| True | True | True | False | True | False | False | True | False | False | False | False |
| True | True | True | False | True | False | True | False | False | False | True | False |
| True | True | True | False | True | False | True | True | False | False | True | False |
| True | True | True | False | True | True | False | False | False | True | True | C23 |
| True | True | True | False | True | True | False | True | False | True | True | C23 |
| True | True | True | False | True | True | True | False | True | True | False | True |
| True | True | True | False | True | True | True | True | True | True | False | True |
| True | True | True | False | True | True | True | True | True | True | False | True |
| True | True | True | True | False | False | False | False | False | False | False | False |
| True | True | True | True | False | False | False | True | False | False | False | False |
| True | True | True | True | False | False | True | False | False | False | True | False |
| True | True | True | True | False | False | True | True | False | False | True | False |
| True | True | True | True | False | True | False | False | False | True | True | C23 |
| True | True | True | True | False | True | False | True | True | True | False | True |
| True | True | True | True | False | True | True | False | True | True | False | True |
| True | True | True | True | False | True | True | True | True | True | False | True |
| True | True | True | True | True | False | False | False | False | False | False | False |
| True | True | True | True | True | False | False | True | False | False | False | False |
| True | True | True | True | True | False | True | False | False | False | True | False |
| True | True | True | True | True | False | True | True | False | True | True | C23 |
| True | True | True | True | True | True | False | False | False | True | True | C23 |
| True | True | True | True | True | True | False | True | True | True | False | True |
| True | True | True | True | True | True | True | False | True | True | False | True |
| True | True | True | True | True | True | True | True | True | True | False | True |

TABLE VIII

Truth Table for Generation of Cin within Carry Logic 228 (FIG. 2);

| GEN | PROP | C23 | Cin |
|---|---|---|---|
| False | False | False | False |
| False | False | True | False |
| False | True | False | False |
| False | True | True | True |
| True | False | False | True |
| True | False | True | True |
| True | True | False | True |
| True | True | True | True |

Cin = GEN | (PROP & C23) where & = AND; | = OR

The adder stage 214 receives the 25 bit mantissa $m_3$, the 25 bit mantissa $m_6$, and the Cin bit signal and adds these together to produce a 25 bit mantissa $m_7$. The second most significant carry bit C23 of the adder stage 214 is fed back to the carry logic 228 as described above. Thus, the input carry bit Cin to the adder stage 214 is a function of the carry bit C23 of the adder stage 214.

Processing continues to the normalizer stage 216, which receives the 25 bit mantissa $m_7$ and the control variable $G_8$ from the round control logic 226. The count up to $e_3$ leading zeros stage 220 examines each bit of the mantissa $m_7$ beginning with the most significant bit $m_7[24]$ and counts logic zeros until the stage 220 counts $e_3$ logic zeros, until the stage 220 encounters a logic one, or until the 25 bits of the mantissa $m_7$ are exhausted, whichever comes first. The stage 220 outputs a control variable LSHIFT that is equal to the number of counted leading logic zeros in the mantissa $m_7$. The left shifter 218 receives and shifts the bits of the 25 bit mantissa $m_7$ to the left to produce a 25 bit mantissa $m_{10}$ according to the value of the control variable, LSHIFT. Accordingly, if LSHIFT is equal to zero, the mantissa $m_7$ is not shifted and the mantissa $m_{10}$ equals the mantissa $m_7$. If LSHIFT is equal to one, then the control variable $G_8$ is shifted in to become the least significant bit of the mantissa $m_{10}$. If LSHIFT is greater than one, the control variable $G_8$ is shifted in, followed by LSHIFT−1 logic zeros, to form the latter part of the mantissa $m_{10}$.

Processing of the mantissa moo continues downward with the removal of the least significant bit $m_{10}[0]$ from the mantissa $m_{10}$. Next, the most significant bit of the resulting 24 bit mantissa is removed to produce the 23 bit mantissa m of the floating point number $f_{result}$ output of the FADD 200. The most significant bit serves as an input to the increment adder stage 224.

The subtract stage 222 subtracts the 8 bit control variable LSHIFT from the 8 bit exponent field value $e_3$ from the unpack stage 104 and produces an 8 bit output that is in turn sent to the increment adder stage 224. The increment adder stage 224 adds the 8 bit output of the subtract stage 222 to the one bit most significant bit described above to produce the 8 bit exponent field e of the floating point number $f_{result}$. The sign bit s1 of the floating point number $f_1$ becomes the sign bit s of the floating point number $f_{result}$. All parts s, e, and m of the floating point number $f_{result}$ are thus known and processing of the FADD 200 terminates.

Operation of the Third Embodiment

Processing of the exemplary FADD 300 shown in FIG. 4 according to the third embodiment is now described. The swapper stage 102 receives two floating point numbers, $i_1$ and $i_0$, and compares theunsigned magnitude of the numbers to determine their relative size. Theunsigned number that is less than or equal to the other unsigned number is designated $f_0$ and is processed on the right-hand side of FIG. 4. The greater or equivalent other unsigned number is designated $f_1$ and is processed on the left-hand side of FIG. 4. The floating point number $f_0$ includes a sign bit $s_0$ (bit 31 of 32), an eight bit exponent field $e_0$ (bits 30–23 of 32), and a mantissa or significant field (bits 22–0 of 32). The floating point number $f_1$ includes a sign bit $s_1$ (bit 31 of 32), an eight bit exponent field $e_1$ (bits 30–23 of 32), and a mantissa or significant field (bits 22–0 of 32).

On the left-hand side of FIG. 4, the sign bit $s_1$ and the eight bit exponent field $e_1$ are removed from $f_1$. Processing of the remaining mantissa continues downward with the introduction of a guard bit $G_1$ having a value of logic zero and an implicit one bit, producing a 25 bit mantissa $m_1$.

On the right-hand side of FIG. 4, the sign bit so and the eight bit exponent field $e_0$ are removed from $f_0$. Processing of the remaining mantissa continues downward with the introduction of an implicit one bit, producing a 24 bit mantissa mo. The implicit one bit is the most significant bit $m_0[23]$ of the mantissa $m_0$.

A control variable for the FADD 300, ADD, is calculated by applying the Boolean equivalence function to the sign bits $s_1$ and $s_0$, so that when $s_1$ and $s_0$ are both false or are both true, the floating point numbers $f_0$ and $f_1$ have the same sign, an addition operation is being performed, and ADD is true, that is, is equal to a logic one. Similarly, when $s_1$ and $s_0$ are different valued, a subtraction operation is being performed, and ADD is false, that is, is equal to a logic zero. The inverter 310 is provided to complement the ADD control variable to produce the SUB control variable which is input to the complement stage 312 and the round control logic 326.

On the left-hand side of FIG. 4, processing continues at the second right shifter 304, which receives the control variable ADD. If ADD=True, then the second right shifter 304 shifts the mantissa $m_1$ to the right by one to produce a mantissa $m_3$ so that $m_3=\{m_3[24], m_3[23], \ldots, m_3[1], m_3[0]\}=\{0, m_1[24]=1, m_1[23], \ldots, m_1[2], m_1[1]\}$. If ADD=False, then $m_1$ passes through the second right shifter 304 without any change so that $m_3$ is equal to $m_1$.

Processing of the mantissa $m_3$ continues downward with the introduction of two control variables, $L_3$ and $G_3$ to the round control logic 326. $G_3$ and $L_3$ respectively represent the least significant bit $m_3[0]$, and the second least significant bit $m_3[1]$ of the mantissa $m_3$. Next, the guard bit $G_3$ of $m_3$, that is, $m_3[0]$, is removed and a new guard bit $G_5$ generated from the round control logic 326 is added as the new least significant bit to produce a mantissa $m_5$. The most significant bit of $m_5$, $m_5[24]$, is complemented by the inverter 306 and returned as the new most significant bit to form a mantissa $m_7$ that serves as an input to the adder stage 314.

Returning to the right-hand side of FIG. 4, the first right shifter 308 receives and shifts the bits of the 24 bit mantissa $m_0$ to the right according to the value of the following control variable, RSHIFT, where $R\text{SHIFT}=e_1-e_0+\text{ADD}.$ Accordingly, if RSHIFT is equal to zero, the mantissa $m_0$ is not shifted. The first right shifter 308 produces a 25 bit mantissa $m_2$ as well as a series of control variables $L_2$, $G_2$, $R_2$, and $S_2$. TABLE IX is a truth table for generation of $L_2$, $G_2$, $R_2$, and $S_2$ within the first right shifter 308 given the value of the control variable RSHIFT. For example, if RSHIFT is equal to 23, then $L_2$ is equal to the most significant bit $m_0[23]$ of the mantissa $m_0$, that is, $L_2$ is True. The control variables $G_2$ and $L_2$ respectively represent the least significant bit $m_2[0]$, and the second least significant bit $m_2[1]$ of the mantissa $m_2$.

TABLE IX

Truth Table for Generation of $L_2$, $G_2$, $R_2$ and $S_2$ within Right Shifter 308 (FIG. 4)

| RSHIFT | $L_2$ | $G_2$ | $R_2$ | $S_2$ |
|---|---|---|---|---|
| 0 | $m_0[0]$ | False | False | False |
| 1 | $m_0[1]$ | $m_0[0]$ | False | False |
| 2 | $m_0[2]$ | $m_0[1]$ | $m_0[0]$ | False |
| 3 | $m_0[3]$ | $m_0[2]$ | $m_0[1]$ | $m_0[0]$ |
| 4 | $m_0[4]$ | $m_0[3]$ | $m_0[2]$ | $(m_0[1] \mid m_0[0])$ |
| 5 | $m_0[5]$ | $m_0[4]$ | $m_0[3]$ | $(m_0[2] \mid m_0[1] \mid m_0[0])$ |
| 6 | $m_0[6]$ | $m_0[5]$ | $m_0[4]$ | $(m_0[3] \mid \ldots \mid m_0[0])$ |
| 7 | $m_0[7]$ | $m_0[6]$ | $m_0[5]$ | $(m_0[4] \mid \ldots \mid m_0[0])$ |
| 8 | $m_0[8]$ | $m_0[7]$ | $m_0[6]$ | $(m_0[5] \mid \ldots \mid m_0[0])$ |
| 9 | $m_0[9]$ | $m_0[8]$ | $m_0[7]$ | $(m_0[6] \mid \ldots \mid m_0[0])$ |
| 10 | $m_0[10]$ | $m_0[9]$ | $m_0[8]$ | $(m_0[7] \mid \ldots \mid m_0[0])$ |
| 11 | $m_0[11]$ | $m_0[10]$ | $m_0[9]$ | $(m_0[8] \mid \ldots \mid m_0[0])$ |
| 12 | $m_0[12]$ | $m_0[11]$ | $m_0[10]$ | $(m_0[9] \mid \ldots \mid m_0[0])$ |
| 13 | $m_0[13]$ | $m_0[12]$ | $m_0[11]$ | $(m_0[10] \mid \ldots \mid m_0[0])$ |
| 14 | $m_0[14]$ | $m_0[13]$ | $m_0[12]$ | $(m_0[11] \mid \ldots \mid m_0[0])$ |
| 15 | $m_0[15]$ | $m_0[14]$ | $m_0[13]$ | $(m_0[12] \mid \ldots \mid m_0[0])$ |
| 16 | $m_0[16]$ | $m_0[15]$ | $m_0[14]$ | $(m_0[13] \mid \ldots \mid m_0[0])$ |
| 17 | $m_0[17]$ | $m_0[16]$ | $m_0[15]$ | $(m_0[14] \mid \ldots \mid m_0[0])$ |
| 18 | $m_0[18]$ | $m_0[17]$ | $m_0[16]$ | $(m_0[15] \mid \ldots \mid m_0[0])$ |
| 19 | $m_0[19]$ | $m_0[18]$ | $m_0[17]$ | $(m_0[16] \mid \ldots \mid m_0[0])$ |
| 20 | $m_0[20]$ | $m_0[19]$ | $m_0[18]$ | $(m_0[17] \mid \ldots \mid m_0[0])$ |
| 21 | $m_0[21]$ | $m_0[20]$ | $m_0[19]$ | $(m_0[18] \mid \ldots \mid m_0[0])$ |
| 22 | $m_0[22]$ | $m_0[21]$ | $m_0[20]$ | $(m_0[19] \mid \ldots \mid m_0[0])$ |
| 23 | True | $m_0[22]$ | $m_0[21]$ | $(m_0[20] \mid \ldots \mid m_0[0])$ |
| 24 | False | True | $m_0[22]$ | $(m_0[21] \mid \ldots \mid m_0[0])$ |
| 25 | False | False | True | $(m_0[22] \mid \ldots \mid m_0[0])$ |
| $\leq 26$ | False | False | False | True | where $\mid$ = OR; and $m_0[i]$ is the ith digit of $m_0$

At the complement stage 312, if SUB is False, then ADD is True and an addition is being performed and none of the inputs to the complement stage 312 are complemented. If, however, SUB is True, each binary digit of the mantissa $m_2$ as well as each of the control variables $L_2$, $G_2$, $R_2$ and $S_2$ are complemented by the complement stage 312. The operation of the complement stage 312 is summarized as follows:

$m_4=\{m_4[24], m_4[23], \ldots, m_4[1], m_4[0]\}=\{m_2[24]\hat{}\text{SUB}, m_2[23]\hat{}\text{SUB}, \ldots, m_2[2]\hat{}\text{SUB}, m_2[1]\hat{}\text{SUB}\},$ $L_4=L_2\hat{}\text{SUB}=m_2[1]\hat{}\text{SUB}=m_4[1],$ $G_4=G_2\hat{}\text{SUB}=m_2[0]\hat{}\text{SUB}=m_4[0],$ $R_4=R_2\hat{}\text{SUB}$, and $S_4=S_2\hat{}\text{SUB}$ where $\hat{}$ represents the Boolean exclusive-or operation.

The 25 bit mantissa $m_4$ produced by the complement stage 312 serves as another input to the adder stage 314. The control variable outputs $L_4$, $G_4$, $R_4$, and $S_4$ of the complement stage 312 are input to the round control logic 326.

TABLE X is a truth table for generation of internal control variables G, L, and $G_5$ within the round control logic 326 given the values of the input control variables $L_3$, $L_4$, $G_3$, and $G_4$ and the internal control variable X. For example, if $L_3$, $L_4$, $G_3$, and $G_4$ are all true, then G and L are False and True. As another example, if $G_3$ or X is True, then $G_5$ is True; otherwise $G_5$ is False. As described above, $G_5$ becomes the least significant bit of the 25 bit mantissa $m_5$. The internal control variable X used to produce $G_5$ is generated according to TABLE XI below.

explains the generation of the signal Cin within the carry logic 328 given the values of the control variables GEN and PROP from the round control logic 326. Similarly, TABLE XII is a truth table for generation of the signal Cin within the

TABLE X

Truth Table for Generation of G, L and $G_5$ within Round Control Logic 326 (FIG. 4);
$L = L_3 \wedge L_4 \wedge (G_3 \& G_4)$;
$G = G_3 \wedge G_4$; $G_5 = G_3 | X$
where $\wedge$ = EXCLUSIVE-OR; & = AND; and | = OR

| $L_3$ | $L_4$ | $G_3$ | $G_4$ | G | L | X | $G_5$ |
|---|---|---|---|---|---|---|---|
| False | False | False | False | False | False | False | False |
| False | False | False | True | True | False | False | False |
| False | False | True | False | True | False | False | True |
| False | False | True | True | False | True | False | True |
| False | True | False | False | False | True | False | False |
| False | True | False | True | True | True | False | False |
| False | True | True | False | True | True | False | True |
| False | True | True | True | False | False | False | True |
| True | False | False | False | False | True | False | False |
| True | False | False | True | True | True | False | False |
| True | False | True | False | True | True | False | True |
| True | False | True | True | False | False | False | True |
| True | True | False | False | False | False | False | False |
| True | True | False | True | True | False | False | False |
| True | True | True | False | True | False | False | True |
| True | True | True | True | False | True | False | True |
| False | False | False | False | False | False | True | True |
| False | False | False | True | True | False | True | True |
| False | False | True | False | True | False | True | True |
| False | False | True | True | False | True | True | True |
| False | True | False | False | False | True | True | True |
| False | True | False | True | True | True | True | True |
| False | True | True | False | True | True | True | True |
| False | True | True | True | False | False | True | True |
| True | False | False | False | False | True | True | True |
| True | False | False | True | True | True | True | True |
| True | False | True | False | True | True | True | True |
| True | False | True | True | False | False | True | True |
| True | True | False | False | False | False | True | True |
| True | True | False | True | True | False | True | True |
| True | True | True | False | True | False | True | True |
| True | True | True | True | False | True | True | True |

TABLE XI is a truth table for generation of the control variables GEN and PROP and the internal control variable X within the round control logic 326 given the values of the internal control variables L and G shown in TABLE X and of the input control variables SUB, $R_4$, and $S_4$. For example, if L, G, $R_4$, $S_4$, and SUB are all True, then GEN and PROP are both True and X is False. The control variables GEN and PROP are input to the carry logic 328. TABLE XI also carry logic 328 given the values of the control variables GEN and PROP and the signal Cout from the adder stage 314. Cout is the most significant carry bit of the adder stage 214. For example, if GEN is False and PROP is True, then Cin follows the value of Cout. If GEN and PROP are both False, then Cin is False. Finally, if GEN is True, then Cin is True.

TABLE XI

Truth Table for Generation of X, GEN, PROP within Round Control
Logic 326 and Cin within Carry Logic 328 (FIG. 4);
X = L & ~G & $R_4$ & $S_4$ & SUB;
GEN = ~X & $R_4$ & (G|$S_4$|SUB)|
G & $S_4$ & SUB; PROP = G & (L|$S_4$|SUB)|X
where & = AND; | = OR; and ~ = NOT

| L | G | $R_4$ | $S_4$ | SUB | X | GEN | PROP | Cin |
|---|---|---|---|---|---|---|---|---|
| False | False | False | False | False | False | False | False | False |
| False | False | False | False | True | False | False | False | False |
| False | False | False | True | False | False | False | False | False |
| False | False | False | True | True | False | False | False | False |
| False | False | True | False | False | False | False | False | False |
| False | False | True | False | True | False | True | False | True |
| False | False | True | True | False | False | True | False | True |
| False | False | True | True | True | False | True | False | True |

TABLE XI-continued

Truth Table for Generation of X, GEN, PROP within Round Control
Logic 326 and Cin within Carry Logic 328 (FIG. 4);
X = L & ~G & $R_4$ & $S_4$ & SUB;
GEN = ~X & $R_4$ & (G|$S_4$|SUB)|
G & $S_4$ & SUB; PROP = G & (L|$S_4$|SUB)|X
where & = AND; | = OR; and ~ = NOT

| L | G | $R_4$ | $S_4$ | SUB | X | GEN | PROP | Cin |
|---|---|---|---|---|---|---|---|---|
| False | True | False | False | False | False | False | False | False |
| False | True | False | False | True | False | False | True | Cout |
| False | True | False | True | False | False | False | True | Cout |
| False | True | False | True | True | False | True | True | True |
| False | True | True | False | False | False | True | False | True |
| False | True | True | False | True | False | True | True | True |
| False | True | True | True | False | False | True | True | True |
| False | True | True | True | True | False | True | True | True |
| True | False | False | False | False | False | False | False | False |
| True | False | False | False | True | False | False | False | False |
| True | False | False | True | False | False | False | False | False |
| True | False | False | True | True | False | False | False | False |
| True | False | True | False | False | False | False | False | False |
| True | False | True | False | True | False | True | False | True |
| True | False | True | True | False | False | True | False | True |
| True | False | True | True | True | True | False | True | Cout |
| True | True | False | False | False | False | False | True | Cout |
| True | True | False | False | True | False | False | True | Cout |
| True | True | False | True | False | False | False | True | Cout |
| True | True | False | True | True | False | True | True | True |
| True | True | True | False | False | False | True | True | True |
| True | True | True | False | True | False | True | True | True |
| True | True | True | True | False | False | True | True | True |
| True | True | True | True | True | False | True | True | True |

TABLE XII

Truth Table for Generation of Cin within Carry Logic 328 (FIG. 4);

| GEN | PROP | Cout | Cin |
|---|---|---|---|
| False | False | False | False |
| False | False | True | False |
| False | True | False | False |
| False | True | True | True |
| True | False | False | True |
| True | False | True | True |
| True | True | False | True |
| True | True | True | True |

Cin = GEN | (PROP & Cout) where & = AND; | = OR

The adder stage 314 receives the 25 bit mantissa $m_7$, the 25 bit mantissa $m_4$, and the Cin bit signal and adds these together to produce a 25 bit mantissa $m_8$. The most significant carry bit Cout of the adder stage 314 is fed back to the carry logic 328 as described above. Thus, the input carry bit Cin to the adder stage 314 is a function of the carry bit Cout of the adder stage 314. Next, the most significant bit of $m_8$, $m_8$[24], is complemented by the inverter 330 and returned as the new most significant bit to form a mantissa $m_9$ that serves as an input to the normalizer stage 316.

Processing continues to the normalizer stage 316, which receives the 25 bit mantissa $m_9$. The count up to $e_1$ leading zeros stage 320 examines each bit of the mantissa $m_9$ beginning with the most significant bit $m_9$[24] and counts logic zeros until the stage 320 counts $e_1$ leading zeros, until the stage 320 encounters a logic one, or until the 25 bits of the mantissa $m_9$ are exhausted, whichever comes first. The stage 320 outputs a control variable LSHIFT that is equal to the number of counted leading logic zeros in the mantissa $m_9$. The left shifter 318 receives and shifts the bits of the 25 bit mantissa $m_9$ to the left to produce a 25 bit mantissa $m_{10}$ according to the value of the control variable, LSHIFT. Accordingly, if LSHIFT is equal to zero, the mantissa $m_9$ is not shifted and the mantissa $m_{10}$ equals the mantissa $m_9$. If LSHIFT is greater than zero, then LSHIFT logic zeros are shifted in to form the latter part of the mantissa $m_{10}$.

Processing of the mantissa $m_{10}$ continues downward with the removal of $G_{10}$ from the mantissa $m_{10}$. $G_{10}$ represents the least significant bit $m_{10}$[0] of the mantissa $m_{10}$. Next, the most significant bit of the resulting 24 bit mantissa is removed to produce the 23 bit mantissa m of the floating point number $f_{result}$ output of the FADD 300.

The subtract stage 322 subtracts the 8 bit control variable LSHIFT from the 8 bit exponent field value $e_1$ and produces an 8 bit output that is in turn sent to the increment adder stage 324. The increment adder stage 324 adds the 8 bit output of the subtract stage 322 to the one bit control variable ADD to yield an 8 bit output. The count up to $e_1$ leading zeros stage 320 also outputs a control variable NOTZERO that is True if the mantissa $m_9$ is not equal to zero and False if $m_9$ is equal to zero. The eight AND gates 332 each receive a respective bit of the 8 bit output of the increment adder stage 324 along with the control variable NOTZERO. If the mantissa $m_9$ is nonzero, then NOTZERO is True and the 8 bit output of the increment adder stage 324 is passed through the eight AND gates 332 to produce the 8 bit exponent field e of the floating point number $f_{result}$. If the mantissa $m_9$ is zero, then NOTZERO is False, the outputs of the eight AND gates 332 are zero, and the 8 bit exponent field e is zero. The sign bit $s_1$ of the floating point number $f_1$ becomes the sign bit s of the floating point number $f_{result}$. All parts s, e, and m of the floating point number $f_{result}$ are thus known and processing of the FADD 300 terminates.

EXAMPLE A

An example that demonstrates the operation of the FADDs 100, 200, 300 according to the embodiments is now described. The swapper stage 102 receives two floating point numbers, $i_1$ and $i_0$, and compares the numbers to determine their relative size. The number that is less than or equal to the other number is designated $f_0$. The floating point number $f_0$ has the following values:

Decimal value: $8388609 = 2^{23}+1$,

| Bit | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| $m_2 =$ | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1. |

$s_0 = 0$,
$e_0 = 1\ 0\ 0\ 1\ 0\ 1\ 1\ 0 = 150$,
and

| Bit | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| $m_{f0} =$ | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1. |

The floating point number $f_1$ has the following values:

Decimal value: $8388610 = 2^{23}+2$, $s_1 = 0$, $e_1 = 1\ 0\ 0\ 1\ 0\ 1\ 1\ 0 = 150$, and

| Bit | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| $m_{f1} =$ | 0 | 0 | 0 | 0 | 0 | 0 | 0 | 0 | 0 | 0 | 0 | 0 | 0 | 0 | 0 | 0 | 0 | 0 | 0 | 0 | 1 | 0. |

The ADD and SUB control variables are calculated:

$ADD = (s_0 == s_1) = (0 == 0) = 1$, indicating an addition operation, and $SUB = \sim ADD = \sim(1) = 0$.

EXAMPLE A

First Embodiment

The floating point numbers $f_1$ and $f_0$, including $m_1 = m_{f1}$ and $m_0 = m_{f0}$, are processed by the unpack stages 104, 106, respectively, so that on the left-hand side of FIG. 1, the sign bit $s_1$ and the eight bit exponent field $e_3 = e_1$ are removed from $f_1$, leaving a 25 bit adjusted mantissa $m_3$,

| Bit | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| $m_3 =$ | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | and on the right-hand side of FIG. 1, the sign bit so and the eight bit exponent field $e_2 = e_0$ are removed from $f_0$, leaving a 25 bit adjusted mantissa $m_2$:

Processing of the mantissa $m_3$ continues downward with the introduction of two control variables, $K_3 = m_3[1] = 1$ and $L_3 = m_3[0] = 0$ to the adder 130.

Processing continues and the right shifter 108 receives and shifts the bits of the 25 bit mantissa $m_2$ to the right according to the value of the following control variable, RSHIFT $RSHIFT = e_3 - e_2 = (1\ 0\ 0\ 1\ 0\ 1\ 1\ 0) - (1\ 0\ 0\ 1\ 0\ 1\ 1\ 0) = 0\ 0\ 0\ 0\ 0\ 0\ 0\ 0$.

Since RSHIFT is equal to zero, the mantissa $m_2$ is not shifted. The right shifter 108 produces a 25 bit mantissa $m_4$

| Bit | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| $m_4$ = | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | as well as a series of control variables $K_4$, $L_4$, $G_4$, $R_4$, and $S_4$. By inspection of TABLE I, $$K_4 = m_2[1] = m_4[1] = 0,\ L_4 = m_2[0] = m_4[0] = 1,\ G_4 = R_4 = S_4 = 0.$$

At the complement stage 112, SUB is False since ADD is True and an addition is being performed and none of the inputs to the complement stage 112 are complemented. The operation of the complement stage 112 is summarized as follows:

| Bit | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| $m_6$ = | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 |

$$K_6 = m_6[1] = 0,\ L_6 = m_6[0] = 1,\ G_6 = R_6 = S_6 = 0.$$

The adder 132 receives the control variable SUB and the input control variables $G_6$, $R_6$, and $S_6$, and, according to TABLE II, generates:

| Bit | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| $m_{11}$ = | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1. |

$G_8 = R_8 = S_8 = 0$, and Cin=0.

The adder 130 receives the values of Cin from the adder 132 and of the pairs of input control variables $K_3$, $L_3$ and $K_6$, $L_6$, and, according to TABLE III, generates:

$$K_8 = L_8 = 1.$$

The adder stage 114 receives the 25 bit mantissa $m_3$, the 25 bit mantissa $m_6$, and the Cin bit signal and adds these together to produce a 25 bit mantissa $m_7$. The carry out bit of the adder stage 114 is discarded and is not used to obtain the final result of the FADD 100.

| Bit | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| Carry | 1 | | | | | | | | | | | | | | | | | | | | | | | | |
| $m_3$ = | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 |
| $m_6$ = | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 |
| Cin | | | | | | | | | | | | | | | | | | | | | | | | | 0 |
| $m_7$ = | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 |

Processing continues to the normalizer stage 116, which receives the 25 bit mantissa $m_7$ and the control variable $G_8$ from the adder 132. The control variable LSHIFT is equal to the number of counted leading logic zeros in the mantissa $m_7$ and is therefore zero. Since LSHIFT is equal to zero, the mantissa $m_7$ is not shifted and the mantissa $m_{11}$ equals the mantissa $m_7$ The control variables $K_8$ and $L_8$ join with $G_8$, $R_8$, and $S_8$ to form a 5 bit word that is input to the left shifter 134:

$$K_8 L_8 G_8 R_8 S_8 = 1\ 1\ 0\ 0\ 0.$$

The shifter 134 receives the 5 bit word consisting of the control variables $K_8$, $L_8$, $G_8$, $R_8$, and $S_8$ and shifts the bits of the 5 bit word to the left to produce a 5 bit word that consists of the control variables $K_{10}$, $L_{10}$, $G_{10}$, $R_{10}$, and $S_{10}$, according to the value of the control variable, LSHIFT. Since LSHIFT=0, there is no shift and, according to TABLE IV, the 5 bit word is equal to $$K_{10}L_{10}G_{10}R_{10}S_{10} = K_8L_8G_8R_8S_8 = 1\ 1\ 0\ 0\ 0.$$

Next, the round control logic 126 receives the control variables $K_{10}$, $L_{10}$, $G_{10}$, $R_{10}$, and $S_{10}$, and, according to TABLE V, generates:

$$INC = 1.$$

The signal INC serves as a carry input to the rounding stage 128.

Processing of the mantissa $m_{11}$ continues downward with the removal of the least significant bit $m_{11}[0]$ from the mantissa $m_{11}$ to produce a 24 bit mantissa $m_{12}$

| Bit | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|
| $m_{12} =$ | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1. |

The rounding stage 128 adds the signal INC to the mantissa $m_{12}$ to produce a 24 bit mantissa $m_{13}$

| Bit | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|
| $m_{13} =$ | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0. |

Next, the most significant bit of the 24 bit mantissa $m_{13}$ is removed to produce the 23 bit mantissa m

| Bit | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| $m =$ | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | of the floating point number $f_{result}$ output of the FADD 100. The most significant bit msb=1 serves as an input to the increment adder stage 124.

The subtract stage 122 subtracts the 8 bit control variable LSHIFT 00000000 from the 8 bit exponent field value $e_3$ 10010110 from the unpack stage 104 and produces an 8 bit output 10010110 that is in turn sent to the increment adder stage 124. The increment adder stage 124 adds the 8 bit output 10010110 of the subtract stage 122 to the one bit most significant bit msb=1 to produce the 8 bit exponent field e 100101111 of the floating point number $f_{result}$. The sign bit $s_1=0$ of the floating point number $f_1$ becomes the sign bit s of the floating point number $f_{result}$. All parts s, e, and m of the floating point number $f_{result}$ are thus known and processing of the FADD 100 terminates.

EXAMPLE A

Second Embodiment

The floating point numbers $f_1$ and $f_0$, including $m_1=m_{f1}$ and $m_0=m_{f0}$, are processed by the unpack stages 104, 106, respectively, so that on the left-hand side of FIG. 2, the sign bit $s_1$ and the eight bit exponent field $e_3=e_1$ are removed from $f_1$, leaving a 25 bit adjusted mantissa $m_3$,

| Bit | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| $m_3 =$ | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | and on the right-hand side of FIG. 2, the sign bit so and the eight bit exponent field $e_2=e_0$ are removed from $f_0$, leaving a 25 bit adjusted mantissa $m_2$:

| Bit | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| $m_2$ = | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1. |

Processing of the mantissa $m_3$ continues downward with the introduction of two control variables, $J_3=m_3[24]=0$, $K_3=m_3[1]=1$, and $L_3=m_3[0]=0$ to the round control logic 226.

Processing continues and the right shifter 208 receives and shifts the bits of the 25 bit mantissa $m_2$ to the right according to the value of the following control variable, RSHIFT $$RSHIFT = e_3 - e_2 = (1\ 0\ 0\ 1\ 0\ 1\ 1\ 0) - (1\ 0\ 0\ 1\ 0\ 1\ 1\ 0) = 0\ 0\ 0\ 0\ 0\ 0\ 0\ 0.$$

Since RSHIFT is equal to zero, the mantissa $m_2$ is not shifted. The right shifter 208 produces a 25 bit mantissa $m_4$ The control variables GEN and PROP and the signal C23 from the adder stage 214 are input to the carry logic 228, which, according to TABLES VII and VIII, generates $$Cin = \text{True} = 1.$$

In this example, Cin does not depend on the value of C23 from the adder stage 214.

| Bit | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| $m_4$ = | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | as well as a series of control variables $J_4$, $K_4$, $L_4$, $G_4$, $P_4$, and $S_4$. By inspection of TABLE I, $$J_4 = m_2[24] = m_4[24] = 0,\ K_4 = m_2[1] = m_4[1] = 0,\ L_4 = m_2[0] = m_4[0] = 1, \text{ and } G_4 = R_4 = S_4 = 0.$$

At the complement stage 212, SUB is False since ADD is True and an addition is being performed and none of the inputs to the complement stage 212 are complemented. The operation of the complement stage 212 is summarized as follows:

| Bit | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| $m_6$ = | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 |

$$J_6 = m_6[24] = 0,\ K_6 = m_6[1] = 0,\ L_6 = m_6[0] = 1,\ G_6 = R_6 = S_6 = 0.$$

The round control logic 226 receives the control variable SUB and the input control variables $J_3$, $K_3$, $L_3$, $J_6$, $K_6$, $L_6$, $G_6$, $R_6$, and $S_6$, and, according to TABLES VI and VII, generates:

The adder stage 214 receives the 25 bit mantissa $m_3$, the 25 bit mantissa $m_6$, and the Cin bit signal and adds these together to produce a 25 bit mantissa $m_7$. The second most significant carry bit C23 of the adder stage 214 is fed back to the carry logic 228.

| Bit | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| Carry | 1 | 0 |  |  |  |  |  |  |  |  |  |  |  |  |  |  |  |  |  |  |  |  |  | 1 | 1 |
| $m_3$ = | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 |
| $m_6$ = | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 |
| Cin |  |  |  |  |  |  |  |  |  |  |  |  |  |  |  |  |  |  |  |  |  |  |  |  | 1 |
| $m_7$ = | 1 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 |

$G_8$=Don't Care,

GEN=True=1, and

PROP=True=1.

$$C23 = \text{CARRY BIT}(m_3[23] + m_6[23] + C22) = \text{CARRY BIT}(1+1+0) = 1.$$

Processing continues to the normalizer stage 216, which receives the 25 bit mantissa $m_7$ and the control variable $G_8$ from the round control logic 226. The control variable LSHIFT is equal to the number of counted leading logic zeros in the mantissa $m_7$ and is therefore zero. Since LSHIFT is equal to zero, the mantissa $m_7$ is not shifted and the mantissa $m_0$ equals the mantissa $m_7$

| Bit | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| $m_{10}=$ | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0. |

Processing of the mantissa $m_{10}$ continues downward with the removal of the least significant bit $m_{10}[0]$ from the mantissa $m_{10}$. Next, the most significant bit of the resulting 24 bit mantissa is removed to produce the 23 bit mantissa m

| Bit | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| m = | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | of the floating point number $f_{result}$ output of the FADD 200. The most significant bit msb=1 serves as an input to the increment adder stage 224.

The subtract stage 222 subtracts the 8 bit control variable LSHIFT 00000000 from the 8 bit exponent field value $e_3$ 10010110 from the unpack stage 104 and produces an 8 bit output 10010110 that is in turn sent to the increment adder stage 224. The increment adder stage 224 adds the 8 bit output 10010110 of the subtract stage 222 to the one bit most significant bit msb=1 to produce the 8 bit exponent field e 10010111 of the floating point number $f_{result}$. The sign bit $s_1=0$ of the floating point number $f_1$ becomes the sign bit s of the floating point number $f_{result}$. All parts s, e, and m of the floating point number $f_{result}$ are thus known and processing of the FADD 200 terminates.

EXAMPLE A

Third Embodiment

On the left-hand side of FIG. 4, the sign bit $s_1$ and the eight bit exponent field $e_1$ are removed from the floating point number $f_1$, leaving the 23 bit mantissa $m_{f1}$. Processing of the mantissa $m_{f1}$ continues downward with the introduction of a guard bit $G_1$ having a value of logic zero as the new least significant bit and an implicit one bit as the new most significant bit, producing a 25 bit mantissa $m_1$ and on the right-hand side of FIG. 4, the sign bit $s_0$ and the eight bit exponent field $e_0$ are removed from the floating point number $f_0$, leaving the 23 bit mantissa $m_{f0}$. Processing of the mantissa $m_{f0}$ continues downward with the introduction of an implicit one bit as the new most significant bit, producing a 24 bit mantissa $m_0$

| Bit | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|
| $m_0=$ | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1. |

| Bit | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| $m_1=$ | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0. |

On the left-hand side of FIG. 4, processing continues at the second right shifter 304, which receives the control variable ADD. ADD is True, so the second right shifter 304 shifts the mantissa $m_1$ to the right by one to produce a mantissa $m_3$

| Bit | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| $m_3 =$ | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0. |

Processing of the mantissa $m_3$ continues downward with the introduction of two control variables, $L_3=m_3[1]=1$, and $G_3=m_3[0]=0$ to the round control logic 326.

Processing continues and the first right shifter 308 receives and shifts the bits of the 25 bit mantissa $m_0$ to the right according to the value of the following control variable, RSHIFT $RSHIFT=e_3-e_2+ADD=(1\ 0\ 0\ 1\ 0\ 1\ 1\ 0)-(1\ 0\ 0\ 1\ 0\ 1\ 1\ 0)+(1)=0\ 0\ 0\ 0\ 0\ 0\ 1$.

Since RSHIFT is equal to one, each bit of the mantissa $m_0$ is shifted to the right by one. The first right shifter 308 produces a 25 bit mantissa $m_2$

| Bit | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| $m_2 =$ | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | as well as a series of control variables $L_2$, $G_2$, $R_2$, and $S_2$. By inspection of TABLE IX, $L_2=m_0[1]=m_2[1]=0$, $G_2=m_0[0]=m_2[0]=1$, $R_2=S_2=0$.

At the complement stage 312, SUB is False since ADD is True and an addition is being performed and none of the inputs to the complement stage 312 are complemented. The operation of the complement stage 312 is summarized as follows:

| Bit | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| $m_4 =$ | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 |

$L_4=m_4[1]=0$, $G_4=m_4[0]=1$, $R_4=S_4=0$.

The round control logic 326 receives the control variable SUB and the input control variables $L_3$, $G_3$, $L_4$, $G_4$, $R_4$, and $S_4$, and, according to TABLES X and XI, generates:

$G_5$=False=0, $GEN$=False=0, and $PROP$=True=1.

The control variables GEN and PROP and the signal Cout from the adder stage 314 are input to the carry logic 328, which, according to TABLES XI and XII, generates $Cin=Cout$.

In this example, Cin follows the value of Cout from the adder stage 314.

Next, the guard bit $G_3$ of $m_3$, that is, $m_3[0]=0$, is removed and a new guard bit $G_5=0$ generated from the round control logic 326 is added as the new least significant bit to produce a mantissa $m_5$

| Bit | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| $m_5 =$ | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0. |

The most significant bit of $m_5$, $m_5[24]$, is complemented by the inverter 306 and returned as the new most significant bit to form a mantissa $m_7$

| Bit | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| $m_7 =$ | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0. | that serves as an input to the adder stage 314.

The adder stage 314 receives the 25 bit mantissa $m_7$, the 25 bit mantissa $m_4$, and the Cin bit signal and adds these together to produce a 25 bit mantissa $m_8$. The most significant carry bit Cout of the adder stage 314 is fed back to the carry logic 328. In order to calculate Cout from the adder stage 314, since Cin follows the value of Cout, an initial value of logic zero is assumed for Cin. If Cout is found to be equal to a logic one when the sum is performed, then Cin is adjusted to a logic one and the sum is performed again. The following illustrates the final sum, once Cin is found to be a logic one.

| Bit | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| Carry | 1 | | | | | | | | | | | | | | | | | | | | | | 1 | 1 | |
| $m_7 =$ | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 |
| $m_4 =$ | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 |
| Cin | | | | | | | | | | | | | | | | | | | | | | | | | 1 |
| $m_8 =$ | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0 |

$C$out=CARRY BIT($m_7[24]+m_4[24]+C23$)=CARRY BIT($1+0+1$)= $C24=1$.

Next, the most significant bit of $m_8$, $m_8[24]$, is complemented by the inverter 330 and returned as the new most significant bit to form a mantissa mg that serves as an input to the normalizer stage 316

| Bit | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| $m_9 =$ | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0. |

Processing continues to the normalizer stage 316, which receives the 25 bit mantissa $m_9$. The control variable LSHIFT is equal to the number of counted leading logic zeros in the mantissa $m_9$ and is therefore zero. Since LSHIFT is equal to zero, the mantissa $m_9$ is not shifted and the mantissa $m_{10}$ equals the mantissa $m_9$

| Bit | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| $m_{10} =$ | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0. |

Processing of the mantissa $m_{10}$ continues downward with the removal of the least significant bit $G_{10}$ from the mantissa $m_{10}$. Next, the most significant bit of the resulting 24 bit mantissa is removed to produce the 23 bit mantissa m

| Bit | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| m = | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | of the floating point number $f_{result}$ output of the FADD 300.

The subtract stage 322 subtracts the 8 bit control variable LSHIFT 00000000 from the 8 bit exponent field value $e_1$ 10010110 and produces an 8 bit output 10010110 that is in turn sent to the increment adder stage 324. The increment adder stage 324 adds the 8 bit output 10010110 of the subtract stage 322 to the one bit control variable ADD=1 to produce the 8 bit exponent field e 10010111 of the floating point number $f_{result}$. The sign bit $S_1$=0 of the floating point number $f_1$ becomes the sign bit s of the floating point number $f_{result}$. All parts s, e, and m of the floating point number $f_{result}$ are thus known and processing of the FADD 300 terminates.

EXAMPLE B

Another example that demonstrates the operation of the FADDs 100, 200, 300 according to the embodiments is now described. The swapper stage 102 receives two floating point numbers, $i_1$ and $i_0$, and compares the numbers to determine their relative size. The number that is less than or equal to the other number is designated $f_0$. The floating point number $f_0$ has the following values:

Decimal value: $-8388605.5 = -(2^{23})+2.5$, $S_0=1$, $e_0=1\ 0\ 0\ 1\ 0\ 1\ 0\ 1=149$, and

| Bit | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| $m_{f0}$ = | 1 | 1 | 1 | 1 | 1 | 1 | 1 | 1 | 1 | 1 | 1 | 1 | 1 | 1 | 1 | 1 | 1 | 1 | 1 | 0 | 1 | 1. |

The floating point number $f_1$ has the following values:

Decimal value: $16777215 = 2^{24}-1$, $S_1=0$, $e_1=1\ 0\ 0\ 1\ 0\ 1\ 1\ 0=150$, and

| Bit | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| $m_{f1}$ = | 1 | 1 | 1 | 1 | 1 | 1 | 1 | 1 | 1 | 1 | 1 | 1 | 1 | 1 | 1 | 1 | 1 | 1 | 1 | 1 | 1 | 1. |

The ADD and SUB control variables are calculated:

ADD=$(s_0==s_1)$=(1==0)=0, indicating a subtraction operation, and

SUB=~ADD=~(0)=1.

EXAMPLE B

First Embodiment

The floating point numbers $f_1$ and $f_0$, including $m_1=m_{f1}$ and $m_0=m_{f0}$, are processed by the unpack stages 104, 106, respectively, so that on the left-hand side of FIG. 1, the sign bit $s_1$ and the eight bit exponent field $e_3=e_1$ are removed from $f_1$, leaving a 25 bit adjusted mantissa $m_3$,

| Bit | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| $m_3$ = | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | and on the right-hand side of FIG. 1, the sign bit $s_0$ and the eight bit exponent field $e_2=e_0$ are removed from $f_0$, leaving a 25 bit adjusted mantissa $m_2$:

| Bit | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| $m_2 =$ | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 0 | 1 | 1. |

Processing of the mantissa $m_3$ continues downward with the introduction of two control variables, $K_3=m_3[1]=1$ and $L_3=m_3[0]=1$ to the adder 130.

Processing continues and the right shifter 108 receives and shifts the bits of the 25 bit mantissa $m_2$ to the right according to the value of the following control variable, RSHIFT $$RSHIFT = e_3 - e_2 = (1\ 0\ 0\ 1\ 0\ 1\ 1\ 0) - (1\ 0\ 0\ 1\ 0\ 1\ 0\ 1) = 0\ 0\ 0\ 0\ 0\ 0\ 0\ 1.$$

Since RSHIFT is equal to one, the right shifter 108 shifts the bits of the mantissa $m_2$ to the right by one, producing a 25 bit mantissa $m_4$

| Bit | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| $m_4 =$ | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 0 | 1 | as well as a series of control variables $K_4$, $L_4$, $G_4$, $R_4$, and $S_4$. By inspection of TABLE I, with RSHIFT equal to one, $$K_4 = m_2[2] = m_4[1] = 0,\ L_4 = m_2[1] = m_4[0] = 1,\ G_4 = m_2[0] = 1,\ R_4 = S_4 = 0.$$

At the complement stage 112, SUB is True since ADD is False and a subtraction is being performed and so the inputs to the complement stage 112 are complemented. The operation of the complement stage 112 is summarized as follows:

| Bit | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| $m_6 =$ | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 |

$$K_6 = m_6[1] = 1,\ L_6 = m_6[0] = 0,\ G_6 = 0,\ R_6 = S_6 = 1.$$

The adder 132 receives the control variable SUB and the input control variables $G_6$, $R_6$, and $S_6$, and, according to TABLE II, generates:

$$G_8 = 1,\ R_8 = S_8 = 0,\ \text{and}\ Cin = 0.$$

The adder 130 receives the values of Cin from the adder 132 and of the pairs of input control variables $K_3$, $L_3$ and $K_6$, $L_6$, and, according to TABLE III, generates:

$$K_8 = 0,\ L_8 = 1.$$

The adder stage 114 receives the 25 bit mantissa $m_3$, the 25 bit mantissa $m_6$, and the Cin bit signal and adds these together to produce a 25 bit mantissa $m_7$. The carry out bit of the adder stage 114 is discarded and is not used to obtain the final result of the FADD 100.

| Bit | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| Carry | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | |
| $m_3 =$ | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| $m_6 =$ | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 |
| Cin | | | | | | | | | | | | | | | | | | | | | | | | | 0 |
| $m_7 =$ | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 |

Processing continues to the normalizer stage 116, which receives the 25 bit mantissa $m_7$ and the control variable $G_8$ from the adder 132. The control variable LSHIFT is equal to the number of counted leading logic zeros in the mantissa $m_7$ and is therefore one. Since LSHIFT is equal to one, the left shifter 118 shifts the bits of the mantissa $m_7$ to the left by one and brings in the control variable $G_8=1$, producing the mantissa $m_{11}$

| Bit | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| $m_{11}=$ | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1. |

The control variables $K_8$ and $L_8$ join with $G_8$, $R_8$, and $S_8$ to form a 5 bit word that is input to the left shifter 134:

$$K_8 L_8 G_8 R_8 S_8 = 0\ 1\ 1\ 0\ 0.$$

The shifter 134 receives the 5 bit word consisting of the control variables $K_8$, $L_8$, $G_8$, $R_8$, and $S_8$ and shifts the bits of the 5 bit word to the left to produce a 5 bit word that consists of the control variables $K_{10}$, $L_{10}$, $G_{10}$, $R_{10}$, and $S_{10}$, according to the value of the control variable, LSHIFT, which in this case is equal to one. According to TABLE IV, the 5 bit word is equal to $$K_{10} L_{10} G_{10} R_{10} S_{10} = L_8 G_8 R_8 S_8 \text{False} = 1\ 1\ 0\ 0\ 0.$$

Next, the round control logic 126 receives the control variables $K_{10}$, $L_{10}$, $G_{10}$, $R_{10}$, and $S_{10}$, and, according to TABLE V, generates:

$$\text{INC}=1.$$

The signal INC serves as a carry input to the rounding stage 128.

Processing of the mantissa $m_{11}$ continues downward with the removal of the least significant bit $m_{11}[0]$ from the mantissa $m_{12}$ to produce a 24 bit mantissa $m_{12}$

| Bit | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|
| $m_{12}=$ | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1. |

The rounding stage 128 adds the signal INC to the mantissa $m_{12}$ to produce a 24 bit mantissa $m_{13}$

| Bit | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|
| $m_{13}=$ | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0. |

Next, the most significant bit of the 24 bit mantissa $m_{13}$ is removed to produce the 23 bit mantissa m

| Bit | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| m = | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | of the floating point number $f_{result}$ output of the FADD 100. The most significant bit msb=1 serves as an input to the increment adder stage 124.

The subtract stage 122 subtracts the 8 bit control variable LSHIFT 00000001 from the 8 bit exponent field value $e_3$ 10010110 from the unpack stage 104 and produces an 8 bit output 10010101 that is in turn sent to the increment adder stage 124. The increment adder stage 124 adds the 8 bit output 10010101 of the subtract stage 122 to the one bit most significant bit msb=1 to produce the 8 bit exponent field e 10010110 of the floating point number $f_{result}$. The sign bit $s_1=0$ of the floating point number $f_1$ becomes the sign bit s of the floating point number $f_{result}$. All parts s, e, and m of the floating point number $f_{result}$ are thus known and processing of the FADD 100 terminates.

EXAMPLE B

Second Embodiment

The floating point numbers $f_1$ and $f_0$, including $m_{11}=m_{f1}$ and $m_0=m_{f0}$, are processed by the unpack stages 104, 106, respectively, so that on the left-hand side of FIG. 2, the sign bit $s_1$ and the eight bit exponent field $e_3=e_1$ are removed from $f_1$, leaving a 25 bit adjusted mantissa $m_3$,

| Bit | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| $m_3$ = | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | and on the right-hand side of FIG. 2, the sign bit $s_0$ and the eight bit exponent field $e_2=e_0$ are removed from $f_0$, leaving a 25 bit adjusted mantissa $m_2$:

| Bit | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| $m_2$ = | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 0 | 1 | 1. |

Processing of the mantissa $m_3$ continues downward with the introduction of two control variables, $J_3=m_3[24]=0$, $K_3=m_3[1]=1$, and $L_3=m_3[0]=1$ to the round control logic 226.

Processing continues and the right shifter 208 receives and shifts the bits of the 25 bit mantissa $m_2$ to the right according to the value of the following control variable, RSHIFT $R\text{SHIFT}=e_3-e_2=(1\ 0\ 0\ 1\ 0\ 1\ 1\ 0)-(1\ 0\ 0\ 1\ 0\ 1\ 0\ 1)=0\ 0\ 0\ 0\ 0\ 0\ 0\ 1.$ Since RSHIFT is equal to one, the right shifter 208 shifts the bits of the mantissa $m_2$ to the right by one, producing a 25 bit mantissa $m_4$

| Bit | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| $m_4$ = | 0 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 0 | 1 | as well as a series of control variables $J_4$, $K_4$, $L_4$, $G_4$, $R_4$, and $S_4$. By inspection of TABLE I, with RSHIFT equal to one, $J_4=m_4[24]=0, K_4=m_2[2]=m_4[1]=0, L_4=m_2[1]=m_4[0]=1, G_4=m_2[0]=1$ and $R_4=S_4=0$.

At the complement stage 212, SUB is True since ADD is False and a subtraction is being performed and so the inputs to the complement stage 212 are complemented. The operation of the complement stage 212 is summarized as follows:

| Bit   | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|-------|----|----|----|----|----|----|----|----|----|----|----|----|----|----|----|---|---|---|---|---|---|---|---|---|---|
| $m_6$ = | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 |

The round control logic 226 receives the control variable SUB and the input control variables $J_3$, $K_3$, $L_3$, $J_6$, $K_6$, $L_6$, $G_6$, $R_6$, and $S_6$, and, according to TABLES VI and VII, generates:

$G_8$=True,

GEN=False=0, and

PROP=True=1.

The control variables GEN and PROP and the signal C23 from the adder stage 214 are input to the carry logic 228, which, according to TABLES VII and VIII, generates Cin=C23.

In this example, Cin follows the value of C23 from the adder stage 214.

The adder stage 214 receives the 25 bit mantissa $m_3$, the 25 bit mantissa $m_6$, and the Cin bit signal and adds these together to produce a 25 bit mantissa $m_7$. The second most significant carry bit C23 of the adder stage 214 is fed back to the carry logic 228. In order to calculate C23 from the adder stage 214, since Cin follows the value of C23, an initial value of logic zero is assumed for Cin. If C23 is found to be equal to a logic one when the sum is performed, then Cin is adjusted to a logic one and the sum is performed again. The following illustrates the final sum, once Cin is found to be a logic one.

zeros in the mantissa $m_7$ and is therefore one. Since LSHIFT is equal to one, the left shifter 218 shifts the bits of the mantissa $m_7$ to the left by one and brings in the control variable $G_8$=1, producing the mantissa $m_{10}$

| Bit | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|-----|----|----|----|----|----|----|----|----|----|----|----|----|----|----|----|---|---|---|---|---|---|---|---|---|---|
| $m_{10}$ = | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 1. |

Processing of the mantissa $m_{10}$ continues downward with the removal of the least significant bit $m_{10}[0]$ from the mantissa $m_{10}$. Next, the most significant bit of the resulting 24 bit mantissa is removed to produce the 23 bit mantissa m

| Bit | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|-----|----|----|----|----|----|----|----|----|----|----|----|----|----|----|---|---|---|---|---|---|---|---|---|
| m = | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | of the floating point number $f_{result}$ output of the FADD 200. The most significant bit msb=1 serves as an input to the increment adder stage 224.

The subtract stage 222 subtracts the 8 bit control variable LSHIFT 00000001 from the 8 bit exponent field value $e_3$ 10010110 from the unpack stage 104 and produces an 8 bit output 10010101 that is in turn sent to the increment adder stage 224. The increment adder stage 224 adds the 8 bit output 10010101 of the subtract stage 222 to the one bit most significant bit msb=1 to produce the 8 bit exponent field e 10010110 of the floating point number $f_{result}$. The sign bit $s_1$=0 of the floating point number $f_1$ becomes the sign bit s of the floating point number $f_{result}$ All parts s, e, and m of the floating point number $f_{result}$ are thus known and processing of the FADD 200 terminates.

| Bit   | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|-------|----|----|----|----|----|----|----|----|----|----|----|----|----|----|----|---|---|---|---|---|---|---|---|---|---|
| Carry | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |   |
| $m_3$ = | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| $m_6$ = | 1 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 |
| Cin   |    |    |    |    |    |    |    |    |    |    |    |    |    |    |    |   |   |   |   |   |   |   |   |   | 1 |
| $m_7$ = | 0 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 |

C23=CARRY BIT($m_3[23]$+$m_6[23]$+C22)=CARRY BIT(1+1+1)=1.

Processing continues to the normalizer stage 216, which receives the 25 bit mantissa $m_7$ and the control variable $G_8$ from the round control logic 226. The control variable LSHIFT is equal to the number of counted leading logic

EXAMPLE B

Third Embodiment

On the left-hand side of FIG. 4, the sign bit $s_1$ and the eight bit exponent field $e_1$ are removed from the floating point number $f_1$, leaving the 23 bit mantissa $m_{f1}$. Processing of the mantissa $m_{f1}$ continues downward with the introduction of a guard bit $G_1$ having a value of logic zero as the new least significant bit and an implicit one bit as the new most significant bit, producing a 25 bit mantissa $m_1$

| Bit | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| $m_1 =$ | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 0. | and on the right-hand side of FIG. 4, the sign bit so and the eight bit exponent field $e_0$ are removed from the floating point number $f_0$, leaving the 23 bit mantissa $m_{f0}$. Processing of the mantissa $m_{f0}$ continues downward with the introduction of an implicit one bit as the new most significant bit, producing a 24 bit mantissa $m_0$

| Bit | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|
| $m_0 =$ | 1 | 1 | 1 | 1 | 1 | 1 | 1 | 1 | 1 | 1 | 1 | 1 | 1 | 1 | 1 | 1 | 1 | 1 | 1 | 1 | 0 | 1 | 1. |

On the left-hand side of FIG. 4, processing continues at the second right shifter 304, which receives the control variable ADD. ADD is False, so the second right shifter 304 does not shift the mantissa $m_1$ and produces a mantissa $m_3$

| Bit | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| $m_3 =$ | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 0 | that is equal to the mantissa $m_1$.

Processing of the mantissa $m_3$ continues downward with the introduction of two control variables, $L_3=m_3[1]=1$, and $G_3=m_3[0]=0$ to the round control logic 326.

Processing continues and the first right shifter 308 receives and shifts the bits of the 25 bit mantissa $m_0$ to the right according to the value of the following control variable, RSHIFT $$RSHIFT=e_3-e_2+ADD=(1\ 0\ 0\ 1\ 0\ 1\ 1\ 0)-(1\ 0\ 0\ 1\ 0\ 1\ 0\ 1)+(0)=0\ 0\ 0\ 0\ 0\ 0\ 0\ 1.$$

Since RSHIFT is equal to one, each bit of the mantissa $m_0$ is shifted to the right by one. The first right shifter 308 produces a 25 bit mantissa $m_2$

| Bit | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| $m_2 =$ | 0 | 1 | 1 | 1 | 1 | 1 | 1 | 1 | 1 | 1 | 1 | 1 | 1 | 1 | 1 | 1 | 1 | 1 | 1 | 1 | 1 | 0 | 1 | 1 | as well as a series of control variables $L_2$, $G_2$, $R_2$, and $S_2$. By inspection of TABLE IX, $$L_2=m_0[1]=m_2[1]=1,\ G_2=m_0[0]=m_2[0]=1,\ R_2=S_2=0.$$

At the complement stage 312, SUB is True since ADD is False and a subtraction is being performed and so the inputs to the complement stage 312 are complemented. The operation of the complement stage 312 is summarized as follows:

| Bit   | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|-------|----|----|----|----|----|----|----|----|----|----|----|----|----|----|----|---|---|---|---|---|---|---|---|---|---|
| $m_4 =$ | 1  | 0  | 0  | 0  | 0  | 0  | 0  | 0  | 0  | 0  | 0  | 0  | 0  | 0  | 0  | 0 | 0 | 0 | 0 | 0 | 0 | 0 | 1 | 0 | 0 |

$L_4 = m_4[1] = 0$, $G_4 = m_4[0] = 0$, $R_4 = S_4 = 1$.

The round control logic 326 receives the control variable SUB and the input control variables $L_3$, $G_3$, $L_4$, $G_4$, $R_4$, and $S_4$, and, according to TABLES X and XI, generates:

$G_5 =$ True $= 1$, $GEN =$ False $= 0$, and $PROP =$ True $= 1$.

The control variables GEN and PROP and the signal Cout from the adder stage 314 are input to the carry logic 328, which, according to TABLES XI and XII, generates $Cin = Cout$.

In this example, Cin follows the value of Cout from the adder stage 314.

Next, the guard bit $G_3$ of $m_3$, that is, $m_3[0] = 0$, is removed and a new guard bit $G_5 = 1$ generated from the round control logic 326 is added as the new least significant bit to produce a mantissa $m_5$

| Bit   | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|-------|----|----|----|----|----|----|----|----|----|----|----|----|----|----|----|---|---|---|---|---|---|---|---|---|---|
| $m_5 =$ | 1  | 1  | 1  | 1  | 1  | 1  | 1  | 1  | 1  | 1  | 1  | 1  | 1  | 1  | 1  | 1 | 1 | 1 | 1 | 1 | 1 | 1 | 1 | 1 | 1 |

The most significant bit of $m_5$, $m_5[24]$, is complemented by the inverter 306 and returned as the new most significant bit to form a mantissa $m_7$

| Bit   | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|-------|----|----|----|----|----|----|----|----|----|----|----|----|----|----|----|---|---|---|---|---|---|---|---|---|---|
| $m_7 =$ | 0  | 1  | 1  | 1  | 1  | 1  | 1  | 1  | 1  | 1  | 1  | 1  | 1  | 1  | 1  | 1 | 1 | 1 | 1 | 1 | 1 | 1 | 1 | 1 | 1 | that serves as an input to the adder stage 314.

value of logic zero is assumed for Cin. If Cout is found to be equal to a logic one when the sum is performed, then Cin is adjusted to a logic one and the sum is performed again.

The following illustrates the final sum, once Cin is found to be a logic one.

| Bit     | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---------|----|----|----|----|----|----|----|----|----|----|----|----|----|----|----|---|---|---|---|---|---|---|---|---|---|
| Carry   | 1  | 1  | 1  | 1  | 1  | 1  | 1  | 1  | 1  | 1  | 1  | 1  | 1  | 1  | 1  | 1 | 1 | 1 | 1 | 1 | 1 | 1 | 1 |   |   |
| $m_7 =$ | 0  | 1  | 1  | 1  | 1  | 1  | 1  | 1  | 1  | 1  | 1  | 1  | 1  | 1  | 1  | 1 | 1 | 1 | 1 | 1 | 1 | 1 | 1 | 1 | 1 |
| $m_4 =$ | 1  | 0  | 0  | 0  | 0  | 0  | 0  | 0  | 0  | 0  | 0  | 0  | 0  | 0  | 0  | 0 | 0 | 0 | 0 | 0 | 0 | 0 | 1 | 0 | 0 |
| Cin     |    |    |    |    |    |    |    |    |    |    |    |    |    |    |    |   |   |   |   |   |   |   |   |   | 1 |
| $m_8 =$ | 0  | 0  | 0  | 0  | 0  | 0  | 0  | 0  | 0  | 0  | 0  | 0  | 0  | 0  | 0  | 0 | 0 | 0 | 0 | 0 | 0 | 0 | 1 | 0 | 0 |

The adder stage 314 receives the 25 bit mantissa $m_7$, the 25 bit mantissa $m_4$, and the Cin bit signal and adds these together to produce a 25 bit mantissa $m_8$. The most significant carry bit Cout of the adder stage 314 is fed back to the carry logic 328. In order to calculate Cout from the adder stage 314, since Cin follows the value of Cout, an initial $Cout =$ CARRY BIT$(m_7[24] + m_4[24] + C23) =$ CARRY BIT$(0+1+1) = C24 = 1$.

Next, the most significant bit of $m_8$, $m_8[24]$, is complemented by the inverter 330 and returned as the new most significant bit to form a mantissa $m_9$ that serves as an input to the normalizer stage 316

| Bit | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| $m_9 =$ | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0. |

Processing continues to the normalizer stage 316, which receives the 25 bit mantissa $m_9$. The control variable LSHIFT is equal to the number of counted leading logic zeros in the mantissa $m_9$ and is therefore zero. Since LSHIFT is equal to zero, the mantissa $m_9$ is not shifted and the mantissa $m_{10}$ equals the mantissa $m_9$.

| Bit | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|
| $m_{10} =$ | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | 0. |

Processing of the mantissa $m_{10}$ continues downward with the removal of the least significant bit $G_{10}$ from the mantissa $m_{10}$. Next, the most significant bit of the resulting 24 bit mantissa is removed to produce the 23 bit mantissa m

| Bit | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|
| $m =$ | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 0 | of the floating point number $f_{result}$ output of the FADD 300.

The subtract stage 322 subtracts the 8 bit control variable LSHIFT 00000000 from the 8 bit exponent field value $e_1$ 10010110 and produces an 8 bit output 10010110 that is in turn sent to the increment adder stage 324. The increment adder stage 324 adds the 8 bit output 10010110 of the subtract stage 322 to the one bit control variable ADD=0 to produce the 8 bit exponent field e 10010110 of the floating point number $f_{result}$. The sign bit $s_1=0$ of the floating point number $f_1$ becomes the sign bit s of the floating point number $f_{result}$. All parts s, e, and m of the floating point number $f_{result}$ are thus known and processing of the FADD 300 terminates.

Of course, it should be understood that the floating point adder 100, 200, 300 system configurations, control logic implementations, and connections shown in FIGS. 1–4 are merely intended to be exemplary, and that other configurations, implementations, and connections are possible and may be used as suitable. For example, although the FADDs 100, 200, 300 of FIGS. 1, 2 and 4 are designed for handling single precision (32-bit) floating point numbers in compliance with the IEEE Std 754 round to nearest methodology, the FADDs 100, 200, 300 may be extended to process any size of floating point numbers as suitable, including, for example, double precision (64-bit) floating point numbers.

The 32 bits of a single precision floating point number include one bit for a sign bit, eight bits for an exponent field, and 23 bits for the mantissa. For norm numbers, a bit value of one is understood to precede the 23 bits of the mantissa, becoming in effect, an implicit one most significant bit. A norm number has an exponent field that takes on a value between zero and 255. A denorm number, by contrast, has an implicit zero most significant bit of the mantissa, a mantissa that is not equal to zero, and an exponent field that is equivalent to zero.

One notable difference between the FADDs 100, 200, 300 is that the FADD 300 is not designed to handle denorm numbers, while the FADDs 100, 200 are equipped to handle denorm numbers. Of course, depending on the demands of a particular application, the capability of handling denorm numbers may or may not be necessary. It should be understood that, where necessary or as desired, all embodiments may be easily modified to handle denorm numbers as in FIGS. 1–3 or otherwise modified to handle only norm numbers as in FIG. 4.

Of course, it should be understood that although inverters and complement stages are illustrated at various points in the FADDs 100, 200, 300, a given signal value and the complement of the given signal value are available at all places as suitable, even though inverters and complement stages are illustrated for clarity. For example, the functions performed by the complement stage 312 of FIG. 4 and the inverter 310 could be incorporated into the round control logic 326. Similarly, although certain control variable values overlap with mantissa values, in some instances, such values are illustrated separately for clarity. For example, in FIG. 2, the control variable outputs $J_4$, $K_4$, and $L_4$ of the right shifter 208 are actually equivalent by definition to values within the mantissa $m_4$ also output by the right shifter 208, these are drawn separately for clarity.

The present invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method acts of the invention can be performed by a programmable processor executing a program of instructions to perform functions of the invention by operating on input data and generating output. The invention can be implemented advantageously in one or more computer programs that executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose to microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

Although the present invention has been particularly described with reference to the preferred embodiments, it should be readily apparent to those of ordinary skill in the art that changes and modifications in the form and details may be made without departing from the spirit and scope of the invention. It is intended that the appended claims include such changes and modifications.

What is claimed is:

1. A method of adding a first floating point number to a second floating point number, wherein the first floating point number is associated with a first mantissa, and the second floating point number is associated with a second mantissa, the method comprising:
    adding the first mantissa, second mantissa, and an input bit together to produce a third mantissa and an output bit;
    generating the input bit based on the first mantissa, second mantissa, and output bit; and
    normalizing the third mantissa to produce a final mantissa, wherein the third mantissa and the final mantissa are correctly rounded as a result of the act of adding.

2. The method according to claim 1, wherein generating the input is further based on a plurality of carry logic signals based on the second mantissa.

3. The method according to claim 1, wherein a less significant bit of the third mantissa depends on a more significant bit of the first mantissa.

4. The method according to claim 1, further comprising:
    prior to the act of adding, aligning the first mantissa with the second mantissa.

5. The method according to claim 1, further comprising:
    prior to the act of adding, if both of the two floating point numbers are positive, shifting a larger or equal floating point number of the two floating point numbers by one position to produce the first mantissa.

6. The method according to claim 1, further comprising:
    prior to the act of adding, if both of the two floating point numbers are positive, shifting
    in a number of zeroes into a smaller or equal floating point number of the two floating point numbers to produce a series of control variables and a fourth mantissa having digits; and
    complementing each digit of the fourth mantissa to produce the second mantissa.

7. A method of adding a first floating point number to a second floating point number, the method comprising:
    unpacking the first floating point number, having a first exponent and a first mantissa of X bits, to generate a second mantissa of at least X+K bits, wherein X and K are positive integers;
    unpacking the second floating point number having a third mantissa of X bits to generate a fourth mantissa of at least X+K bits;
    adding the second mantissa to the fourth mantissa to produce a fifth mantissa of X+K bits; and
    normalizing the fifth mantissa.

8. The method according to claim 7, wherein when the first exponent is 0, bits 00 are supplemented to the first mantissa, otherwise bits 01 are supplemented to the first mantissa.

9. A method of adding a first floating point number to a second floating point number, the method comprising:
    adding a first mantissa, associated with the first floating point number, a second mantissa, associated with the second floating point number, and an input bit together to produce a third mantissa and an output bit;
    rounding the third mantissa by updating the input bit based on the output bit to produce a fourth mantissa;
    normalizing the fourth mantissa; and
    integrating the acts of adding and rounding within a single adder so that a separate adder to produce a correctly rounded result is not needed and so that the acts of adding and rounding are performed prior to the act of normalizing.

10. The method according to claim 9, wherein a less significant bit of the fourth mantissa depends on a more significant bit of the fourth mantissa.

11. A method of adding a first floating point number to a second floating point number, the method comprising:
    receiving a first floating point number having a first mantissa and a second floating point number having a second mantissa;
    respectively shifting the first mantissa and the second mantissa as appropriate to obtain a fourth mantissa and a fifth mantissa;
    producing a first carry bit from a second carry bit and from round control variables derived from the first mantissa and the second mantissa;
    adding the fourth mantissa, the fifth mantissa and the first carry bit together to produce a sixth mantissa and the second carry bit, wherein the sixth mantissa is correctly rounded; and
    shifting the sixth mantissa to produce the third mantissa.

12. The method according to claim 11, wherein a less significant bit of the sixth mantissa depends on a more significant bit of the fourth mantissa.

13. A floating point adder system to add a first floating point number to a second floating point number, the system comprising:
    an adder to perform an add operation to add a first mantissa, associated with the first floating point number, a second mantissa, associated with the second floating point number, and an input bit together to produce a third mantissa and an output bit;
    a carry logic circuit coupled to the input bit and generating the output bit; and
    a shifter coupled to the adder to normalize the third mantissa to produce a final mantissa,
    wherein the third mantissa and the final mantissa are correctly rounded as a result of the add operation performed by the adder.

14. The system according to claim 13, wherein the carry logic circuit comprises and OR gate and an AND gate.

15. The system according to claim 13, wherein a less significant bit of the third mantissa depends on a more significant bit of first mantissa.

16. A computer readable medium containing programming instructions for adding a first floating point number to a second floating point number, said programming instructions comprising instructions for:

adding a first mantissa, associated with the first floating point number, a second mantissa, associated with the second floating point number, and an input bit together to produce a third mantissa and an output bit;

generating the input bit using the output bit; and normalizing the third mantissa to produce a final mantissa, wherein the third mantissa and the final mantissa are correctly rounded as a result of the act of adding.

17. A floating point adder system to add a first floating point number to a second floating point number, the system comprising:

means for adding a first mantissa, associated with the first floating point number, a second mantissa, associated with the second floating point number, and an input bit together to produce a third mantissa and an output bit;

means for updating the input bit based on the output bit;

means for normalizing the third mantissa.

* * * * *